(12) United States Patent
Ohishi et al.

(10) Patent No.: US 10,066,045 B2
(45) Date of Patent: Sep. 4, 2018

(54) RESIN COMPOSITION CONTAINING BLOCK COPOLYMER

(71) Applicant: DENKA COMPANY LIMITED, Chuo-ku (JP)

(72) Inventors: Masayuki Ohishi, Ichihara (JP); Jun Yoshida, Ichihara (JP); Eiji Sato, Ichihara (JP)

(73) Assignee: Denka Company Limited, Chuo-ku (JP)

( * ) Notice: Subject to any disclaimer, the term of this patent is extended or adjusted under 35 U.S.C. 154(b) by 92 days.

(21) Appl. No.: 15/316,690

(22) PCT Filed: Jun. 3, 2015

(86) PCT No.: PCT/JP2015/066093
§ 371 (c)(1),
(2) Date: Dec. 6, 2016

(87) PCT Pub. No.: WO2015/186756
PCT Pub. Date: Dec. 10, 2015

(65) Prior Publication Data
US 2017/0198079 A1    Jul. 13, 2017

(30) Foreign Application Priority Data

Jun. 6, 2014 (JP) ................................ 2014-118120

(51) Int. Cl.

| | |
|---|---|
| *C08F 297/04* | (2006.01) |
| *C08L 53/02* | (2006.01) |
| *C08L 101/00* | (2006.01) |
| *B65D 65/40* | (2006.01) |
| *C08J 5/18* | (2006.01) |
| *C08L 25/06* | (2006.01) |

(52) U.S. Cl.
CPC ............ *C08F 297/04* (2013.01); *B65D 65/40* (2013.01); *C08J 5/18* (2013.01); *C08L 25/06* (2013.01); *C08L 53/02* (2013.01); *C08L 101/00* (2013.01); *C08J 2325/06* (2013.01); *C08J 2353/02* (2013.01); *C08J 2425/06* (2013.01); *C08J 2453/02* (2013.01); *C08L 2201/10* (2013.01)

(58) Field of Classification Search
CPC ...... C08F 297/04; C08J 2353/02; C08L 53/02
See application file for complete search history.

(56) References Cited

U.S. PATENT DOCUMENTS

| | | | |
|---|---|---|---|
| 6,107,411 A | 8/2000 | Toya et al. | |
| 2004/0102576 A1 | 5/2004 | Matsui et al. | |
| 2015/0284606 A1* | 10/2015 | Stol ...................... | C08F 297/02 524/574 |

FOREIGN PATENT DOCUMENTS

| | | |
|---|---|---|
| JP | 4-261458 A | 9/1992 |
| JP | 5-306313 A | 11/1993 |
| JP | 7-228646 A | 8/1995 |
| JP | 11-158241 A | 6/1999 |
| JP | 11-255851 A | 9/1999 |
| JP | 2000-26698 A | 1/2000 |
| JP | 2004-346259 A | 12/2004 |
| JP | 2006-124718 A | 5/2006 |
| JP | 2009-114309 A | 5/2009 |
| JP | 2010-24387 A | 2/2010 |
| JP | 2011-157512 A | 8/2011 |

OTHER PUBLICATIONS

International Search Report dated Aug. 25, 2015 in PCT/JP2015/066093 filed Jun. 3, 2015.

* cited by examiner

*Primary Examiner* — Mark S Kaucher
(74) *Attorney, Agent, or Firm* — Oblon, McClelland, Maier & Neustadt, L.L.P.

(57) ABSTRACT

To provide a resin composition containing a block copolymer of a vinyl aromatic hydrocarbon and a conjugated diene, from which a formed product such as a sheet or a film, having excellent transparency and impact resistance, can be obtained. A resin composition containing a block copolymer of a vinyl aromatic hydrocarbon and a conjugated diene, which satisfies the following (A) to (D):

(A) the content ratio (mass) of the conjugated diene is from 22 to 32%,
(B) the block ratio of the vinyl aromatic hydrocarbon is from 90 to 98%,
(C) Mw/Mn (wherein Mw is the weight average molecular weight and Mn is the number average molecular weight) is from 1.1 to 1.6 obtained by GPC by differential refractive index method,
(D) the loss tangent (tan δ) obtained by dynamic viscoelasticity measurement has one local maximum value (tan δ (max)) within a temperature range of from −90 to −30° C., and tan δ (tan δ (max+30° C.)) at a temperature higher by 30° C. than the temperature at the local maximum value (tan δ peak temperature) is at least 0.6 relative to tan δ (tan δ (max)) at the temperature at the local maximum value.

13 Claims, No Drawings

US 10,066,045 B2

RESIN COMPOSITION CONTAINING BLOCK COPOLYMER

TECHNICAL FIELD

The present invention relates to a resin composition containing a block copolymer of a vinyl aromatic hydrocarbon and a conjugated diene. More particularly, it relates to a resin composition containing a block copolymer, from which a formed product such as a sheet or a film having excellent impact resistance and transparency can be obtained, and which is useful as a block copolymer-containing resin composition itself or as blended with various thermoplastic resins.

BACKGROUND ART

A resin composition containing a block copolymer of a vinyl aromatic hydrocarbon and a conjugated diene with a relatively high content of the vinyl aromatic hydrocarbon, especially a resin composition having a block copolymer of styrene and butadiene blended with a styrene polymer (GPPS) is widely used for injection molding or for extrusion to obtain a sheet, a film, etc., since its formed product has properties such as high transparency and impact resistance. And, various proposals have been made for the purpose of further improving properties of a formed product obtainable from such a resin composition containing a block copolymer, such as rigidity, surface hardness, folding strength, elastic modulus in tension, sheet impact, transparency and impact resistance.

For example, a polystyrene polymer composition having a structural formula (A-B)—Si comprising a styrene/butadiene copolymer block A containing at least 50 wt % of styrene and a styrene/butadiene copolymer block B containing at least 50 wt % of butadiene, is disclosed in Patent Document 1. Further, a method for producing a block copolymer, for producing a block copolymer comprising a conjugated diene and a vinyl-substituted aromatic hydrocarbon by a batch polymerization method using an organic lithium compound as an initiator, wherein (a) the organic lithium compound and a monomer constituting a first stage block are continuously supplied simultaneously, and (b) the supply time ratio of the organic lithium compound/the monomer constituting the first stage block is from 0.1 to 1.0, is disclosed in Patent Document 2.

Further, a block copolymer composition comprising two types of block copolymers each having a specific content of a vinyl aromatic hydrocarbon constituting the block copolymer and a specific block ratio of the vinyl aromatic hydrocarbon polymer block, and a styrene resin in combination, is disclosed in Patent Document 3. A styrene resin composition comprising a linear block copolymer of which the weight ratio of a vinyl aromatic hydrocarbon to a conjugated diene, a polymer block between a terminal polymer block and a terminal polymer block, the molecular weight of the polymer block, and the molecular weight of a vinyl aromatic hydrocarbon polymer block are controlled, is disclosed in Patent Document 4. Further, a block copolymer which comprises a polymer block containing a vinyl aromatic hydrocarbon as the main component and a polymer block containing a conjugated diene as the main component, which has a polymer structure of a specific linear block copolymer, in which the constituting monomer units are in a specific mass ratio, and which has a specific molecular weight distribution, is disclosed in Patent Document 5.

Further, Patent Document 6 discloses a block copolymer of which a specific local maximum value of the loss elastic modulus is observed within a temperature range of from −20° C. to +20° C. by dynamic viscoelasticity measurement, and of which the mass ratio of the conjugated diene based on the total mass of the block copolymer is within a specific range, focusing attention on the dynamic viscoelasticity of a block copolymer containing a vinyl aromatic hydrocarbon and a conjugated diene not disclosed in the above Patent Documents 1 to 5.

However, with respect to the above conventional block copolymer resin compositions and resin compositions of such compositions with various thermoplastic resins, it is desired to achieve more excellent properties of a formed product obtainable from the resin compositions, especially a sheet, a film, etc., that is, higher impact resistance, transparency, etc., without decreasing properties such as the sheet impact, folding strength and elastic modulus in tension.

PRIOR ART DOCUMENTS

Patent Documents

Patent Document 1: JP-A-5-306313
Patent Document 2: JP-A-7-228646
Patent Document 3: JP-A-4-261458
Patent Document 4: JP-A-11-255851
Patent Document 5: JP-A-2004-346259
Patent Document 6: JP-A-2010-24387

DISCLOSURE OF INVENTION

Technical Problem

It is an object of the present invention to provide a resin composition containing a block copolymer of a vinyl aromatic hydrocarbon and a conjugated diene (hereinafter sometimes referred to simply as a resin composition) such that an obtainable formed product such as a sheet or a film can achieve high impact resistance and transparency in a balanced manner without decreasing other properties such as folding strength, elastic modulus in tension and sheet impact, and a resin composition containing such a resin composition and a thermoplastic resin.

Solution To Problem

The present inventors have conducted extensive studies to achieve the above object and as a result, found that the above object can be achieved by a resin composition having (A) a content ratio of the conjugated diene, (B) a block ratio of the vinyl aromatic hydrocarbon and (C) Mw/Mn obtained by gel permeation chromatography (GPC) by differential refractive index method within specific ranges, and satisfying the requirement (D) the loss tangent (tan δ) obtained by dynamic viscoelasticity measurement has one local maximum value (tan δ (max)) within a temperature range of from −90 to −30° C., and tan δ (tan δ (max+30° C.)) at a temperature higher by 30° C. than the temperature at the local maximum value (tan δ peak temperature) is in a specific proportion relative to tan δ (tan δ (max)) at the temperature at the local maximum value, that is, (tan δ (max+30° C.)/tan δ (max)) is in a specific proportion, and accomplished the present invention.

Particularly, of the resin composition containing a block copolymer of the present invention, the after-mentioned range of at least 0.6 which is the above requirement (D)

regarding the dynamic viscoelasticity, is a value which has not been achieved by a conventional resin composition of the same type, and greatly contributes to the achievement of the object of the present invention, as mentioned hereinafter.

Thus, the present invention provides a resin composition containing a block copolymer of a vinyl aromatic hydrocarbon and a conjugated diene, which satisfies the following (A) to (D):

(A) the content ratio (mass) of the conjugated diene is from 22 to 32%, (B) the block ratio of the vinyl aromatic hydrocarbon is from 90 to 98%, (C) Mw/Mn (wherein Mw is the weight average molecular weight and Mn is the number average molecular weight) is from 1.1 to 1.6 obtained by gel permeation chromatography (GPC) by differential refractive index method, (D) the loss tangent (tan δ) obtained by dynamic viscoelasticity measurement has one local maximum value (tan δ (max)) within a temperature range of from −90 to −30° C., and tan δ (tan δ (max+30° C.)) at a temperature higher by 30° C. than the temperature at the local maximum value (tan δ peak temperature) is at least 0.6 relative to tan δ (tan δ(max)) at the temperature at the local maximum value.

Advantageous Effects of Invention

By using the resin composition containing a block copolymer of a vinyl aromatic hydrocarbon and a conjugated diene of the present invention, or a resin composition containing such a resin composition and another thermoplastic resin, a product formed by extrusion such as a sheet or a film, or a product formed by injection molding, having high impact resistance and transparency in a balanced manner can be obtained without decreasing other properties such as folding strength, elastic modulus in tension and sheet impact.

The reason why the above advantageous effects can be obtained by the present invention is not clearly understood. However, as evident from comparison between Examples and Comparative Examples mentioned hereinafter, the above effects are considered to be achieved by the resin composition of the present invention satisfying the above requirements (A) to (D), particularly the requirement (D) relating to the dynamic viscoelasticity, which has not been achieved by a conventional resin composition containing a block copolymer of a vinyl aromatic hydrocarbon and a conjugated diene.

That is, in order that the block copolymer of a vinyl aromatic hydrocarbon and a conjugated diene of the present invention satisfies, tan δ (max+30° C.)/tan δ (max) of at least 0.6 as the above requirement (D), it is necessary that soft segment blocks and hard segment blocks are repeated. In view of polymer design, although both the blocks are clearly distinguished, a hard segment block sandwiched between soft segment blocks is considered to be incorporated into the soft segment blocks and to apparently function as a soft segment. Accordingly, it is considered that the content ratio (mass) of the conjugated diene can be decreased without decreasing the proportion of the soft segment blocks in the block copolymer, and the transparency improves. Further, it is considered that since Tg at the low temperature side (tan δ peak temperature) does not substantially change as compared with a case of only soft segment blocks, the apparently incorporated hard segment blocks do not impair the function of the soft segments, and favorable impact resistance can be obtained. Thus, it is considered that usually conflicting transparency and impact resistance be satisfied by the above requirement (D) of the present invention being satisfied.

DESCRIPTION OF EMBODIMENTS

The resin composition containing a block copolymer of a vinyl aromatic hydrocarbon and a conjugated diene of the present invention (hereinafter sometimes referred to simply as the resin composition of the present invention) is required to satisfy the above requirements (A) to (D).

Here, the vinyl aromatic hydrocarbon used may, for example, be styrene, o-methylstyrene, p-methylstyrene, p-tert-butylstyrene, 2,4-dimethylstyrene, 2,5-dimethylstyrene, α-methylstyrene, vinylnaphthalene or vinylanthracene. Among them, styrene is preferred. The vinyl aromatic hydrocarbon may be used alone or in combination of two or more.

Further, the conjugated diene may, for example, be 1,3-butadiene, 2-methyl-1,3-butadiene (isoprene), 2,3-dimethyl-1,3-butadiene, 1,3-pentadiene or 1,3-hexadiene. Among them, preferred is 1,3-butadiene or isoprene. The conjugated diene may be used alone or in combination of two or more.

The resin composition containing a block copolymer of the present invention comprises a block copolymer of a vinyl aromatic hydrocarbon and a conjugated diene, and the block copolymer of a vinyl aromatic hydrocarbon and a conjugated diene may be used alone or as a mixture of two or more, and within a range not to impair the effects, additives or another resin may be used in combination.

The block copolymer of the present invention preferably has a structure having a block consisting of the vinyl aromatic hydrocarbon and a random block consisting of the vinyl aromatic hydrocarbon and the conjugated diene optionally combined.

The random block is a structure obtained by adding the vinyl aromatic hydrocarbon and the conjugated diene at constant flow rates to a reactor to randomly polymerize the vinyl aromatic hydrocarbon and the conjugated diene. The randomized state in the random block site may be adjusted by the addition rates of the vinyl aromatic hydrocarbon and the conjugated diene, the temperature and the concentration of a randomizing agent.

Now, production of the block copolymer of the present invention will be described. The block copolymer can be produced by subjecting vinyl aromatic hydrocarbon and conjugated diene monomers to anionic polymerization using an organic lithium compound as a polymerization initiator in an organic solvent. The organic solvent may, for example, be an aliphatic hydrocarbon such as butane, pentane, hexane, isopentane, heptane, octane or isooctane, an alicyclic hydrocarbon such as cyclopentane, methylcyclopentane, cyclohexane, methylcyclohexane or ethylcyclohexane, or an aromatic hydrocarbon such as ethylbenzene or xylene. In view of solubility of the block copolymer, cyclohexane is preferred.

The organic lithium compound is a compound having at least one lithium atom bonded in its molecule and may, for example, be a monofunctional organic lithium compound such as ethyllithium, n-propyllithium, isopropyllithium, n-butyllithium, sec-butyllithium or tert-butyllithium, or a multifunctional organic lithium compound such as hexamethylenedilithium, butadienyldilithium or isoprenyldilithium.

As each of the vinyl aromatic hydrocarbon and the conjugated diene in the present invention, the above-mentioned one may be used, and one or more may be selected and used for polymerization. In living anionic polymerization using the organic lithium compound as a polymerization initiator, the vinyl aromatic hydrocarbon and the conjugated diene subjected to the polymerization reaction are substantially entirely converted to a polymer.

The molecular weight of the block copolymer in the present invention may be controlled by the addition amount of the polymerization initiator based on the total amount of the monomers added.

The block ratio of the vinyl aromatic hydrocarbon may be adjusted by the supply rates of the vinyl aromatic hydrocarbon and the conjugated diene and the addition amount of the randomizing agent when the vinyl aromatic hydrocarbon and the conjugated diene are polymerized to prepare the block copolymer.

The randomizing agent is a compound which acts as a Lewis base during the reaction, and an amine, an ether, a thioether, a phosphoramide or an alkylbenzene sulfonate, and in addition, a potassium or sodium alkoxide may, for example, be used.

The amine may, for example, be a tertiary amine such as trimethylamine, triethylamine or tetramethylethylenediamine or a cyclic tertiary amine.

The ether may, for example, be dimethyl ether, diethyl ether, diphenyl ether, diethylene glycol dimethyl ether, diethylene glycol diethyl ether, diethylene glycol dibutyl ether or tetrahydrofuran (THF).

In addition, triphenylphosphine, hexamethylphosphoramide, potassium or sodium alkylbenzenesulfonate, or butoxide of potassium, sodium or the like, may, for example, be mentioned. Preferred is tetrahydrofuran (THF).

The randomizing agent may be used alone or in combination of two or more. The addition concentration is preferably from 0.001 to 10 parts by mass, more preferably from 0.01 to 0.1 part by mass per 100 parts by mass of the monomers as the material.

The timing of addition may be before the start of the polymerization reaction or may be before polymerization of copolymer chains. Further, as the case require, the randomizing agent may be additionally supplied.

Further, after all the monomers are added and the polymerization is completed, a coupling agent may be added to conduct coupling. Here, coupling means a bond of at least two polymer chains by means of one coupling agent molecule formed by a covalent bond between a living active site present in one terminal of the polymer chain and a reactive site of the coupling agent molecule. A coupling agent is a compound having at least two reactive sites which the living active site may attack, per one molecule.

The coupling agent is not limited and may, for example, be a chlorosilane compound such as dimethyldichlorosilane, silicon tetrachloride or 1,2-bis(methyldichlorosilyl)ethane, an alkoxysilane compound such as dimethyldimethoxysilane, tetramethoxysilane or tetraphenoxysilane, tin tetrachloride, a polyhalogenated hydrocarbon, a carboxylic acid ester, a polyvinyl compound, or an epoxydized oil such as epoxidized soybean oil or epoxidized linseed oil. Preferred is an epoxidized oil, more preferred is epoxidized soybean oil.

As a difunctional coupling agent having two reactive sites per one molecule, dimethyldichlorosilane or dimethyldimethoxysilane may, for example, be mentioned, and as a trifunctional coupling agent having at least three reactive sites per one molecule, methyltrichlorosilane or methyltrimethoxysilane may, for example, be mentioned. As a tetrafunctional coupling agent having four reactive sites per one molecule, tetrachlorosilane, tetramethoxysilane or tetraphenoxysilane may, for example, be mentioned, and an epoxidized oil, which has three ester groups per one molecule and further has from 0 to 3 epoxy groups per one long chain alkyl group on the three long chain alkyl group sides, is a multifunctional coupling agent.

Such a coupling agent may be used alone, or two or more types of multifunctional coupling agents may be used in combination. Further, it is possible to use at least one difunctional coupling agent and at least one multifunctional coupling agent in combination. Preferably, a multifunctional coupling agent is used alone.

Further, the reactive sites of the coupling agent which the living active site may attack are not necessarily completely reacted, but a part of the reactive sites may remain unreacted. Further, all the polymer chains having a living active site at one terminal are not necessarily completely reacted with the reactive sites of the coupling agent, but unreacted polymer chains may remain in the block copolymer finally obtained. And, a block copolymer having a branch number smaller than a branch number estimated when the reactive sites of the coupling agent are completely reacted may coexist in the finally produced block copolymer. Further, a polymer chain having one terminal bonded to a coupling agent only, having its living active site simply replaced by the coupling agent, may coexist in the finally produced block copolymer. Indeed, the finally produced block copolymer is preferably a mixture of at least two of the block copolymer having a branch number equal to a branch number estimated when the reactive sites of the coupling agent used are completely reacted, the block copolymer having a branch number smaller than a branch number estimated when the reactive sites of the coupling agent used are completely reacted, the polymer chain having its living active site simply replaced by the coupling agent, and a polymer chain remaining unreacted with the reactive sites of the coupling agent, with a view to obtaining favorable forming processability.

The addition amount of the coupling agent may be optional, but is preferably adjusted to such an amount as to make the reactive sites of the coupling agent stoichiometrically excessively present to the living active terminals. Specifically, it is preferred to add the coupling agent in such an amount as to make the reactive sites present in an amount of 1 to 2 equivalents to the number of moles of the living active terminals present in a polymerization solution before coupling step.

The block copolymer thus obtained may be deactivated by adding a polymerization terminator such as water, an alcohol or carbon dioxide in an amount sufficient to deactivate the active terminals. To recover the copolymer from the organic solvent solution of the block copolymer obtained, a method by precipitation in a poor solvent such as methanol, a method by precipitation by evaporating the solvent by a heated roll or the like (drum dryer method), a method of concentrating the solution by a concentrator and then removing the solvent by a vent-type extruder, a method of dispersing the solution in water, and blowing water vapor to heat and remove the solvent thereby to recover the copolymer (steam stripping method) or the like may optionally be employed.

The resin composition of the present invention is required to satisfy the requirement (A) the content ratio of the conjugated diene is from 22 to 32 mass %. If the content ratio of the conjugated diene is less than 22 mass %, the impact strength of the resin composition will decrease. On the other hand, if the content ratio of the conjugated diene exceeds 32 mass %, the rigidity and the transparency will decrease. The content ratio of the conjugated diene is preferably from 23 to 32 mass %, more preferably from 24 to 30 mass %.

The resin composition of the present invention is required to satisfy the requirement (B) the block ratio of the vinyl aromatic hydrocarbon in the resin composition is from 90 to 98%. Here, the block ratio (%) of the vinyl aromatic hydrocarbon is a value determined as follows.

Block ratio (%) of vinyl aromatic hydrocarbon=(the mass of the vinyl aromatic hydrocarbon present as block homopolymer segments in the copolymer/the mass of the vinyl aromatic hydrocarbon contained in the copolymer)×100

In the present invention, if the block ratio of the vinyl aromatic hydrocarbon in the resin composition is less than 90%, the impact strength will decrease. On the other hand, if the block ratio of the vinyl aromatic hydrocarbon exceeds 98%, the rigidity and the transparency will decrease. The block ratio is preferably from 91 to 97%, more preferably from 92 to 96%.

The resin composition of the present invention needs to satisfy the requirement (C) the molecular weight distribution, that is, the weight average molecular weight (Mw)/number average molecular weight (Mn), obtained by GPC measurement by differential refractive index method, is from 1.1 to 1.6. If Mw/Mn is less than 1.1, the impact strength will decrease. On the other hand, if Mw/Mn exceeds 1.6, the impact strength and the transparency will decrease. Mw/Mn is preferably from 1.2 to 1.6, more preferably from 1.2 to 1.5.

Still further, the resin composition of the present invention needs to satisfy the requirement (D) the loss tangent (tan δ) obtained by dynamic viscoelasticity measurement has one local maximum value (tan δ (max)) within a temperature range of from −90 to −30° C., and tan δ (tan δ (max+30° C.)) at a temperature higher by 30° C. than the temperature at the local maximum value (tan δ peak temperature) is in a proportion of at least 0.6 relative to tan δ (tan δ max)) at the temperature at the local maximum value, that is, (tan δ (max+30° C.)/tan δ (max)) is at least 0.6.

A conventional resin composition containing a block copolymer of a vinyl aromatic hydrocarbon and a conjugated diene has the above ratio (tan δ (max+30° C.)/tan δ (max)) being less than 0.6 even though tan δ has one local maximum value within a temperature range of from −90 to −30° C. Particularly in the present invention, the above ratio (tan δ (max+30° C.)/tan δ (max)) is preferably at least 0.65, more preferably at least 0.70, whereby an obtainable formed product has improved impact resistance and transparency in a balanced manner without impairing other properties. In the present invention, there is no upper limit for the above ratio (tan δ (max+30° C.)/tan δ (max)) and the ratio is preferably higher, but is usually less than 1.

The resin composition of the present invention contains a block copolymer of a vinyl aromatic hydrocarbon and a conjugated diene, preferably contains at least two types of block copolymers differing in the molecular weight, which satisfy the above requirements (A) to (D). The block copolymer has a chemical structure preferably represented by the following formula (I) and/or (II), and at least two types of block copolymers of a vinyl aromatic hydrocarbon and a conjugated diene, differing in the molecular weight, are preferably contained.

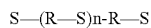  (I)

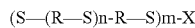  (II)

In the above formulae (I) and (II), S is a polymer block in which a monomer unit consists of the vinyl aromatic hydrocarbon, and R is a random copolymer block in which a monomer unit consists of the vinyl aromatic hydrocarbon and the conjugated diene.

m represents the number of a polymer chain bonded to a coupling agent residue. m is an integer of at least 1, preferably from 2 to 10, more preferably from 2 to 5. n represents the number of repeating units, and is an integer of at least 1. In view of polymerization operation efficiency, n is preferably from 1 to 5, more preferably from 1 to 3. X represents a residue of a coupling agent.

By the block copolymer having such a chemical structure, a formed product obtainable from the resin composition of the present invention is excellent in the balance of physical properties such as the impact resistance and the transparency.

The block copolymer of a vinyl aromatic hydrocarbon and a conjugated diene represented by the above formula (I) and/or (II) can be obtained by anionic polymerization as mentioned above.

In the above formulae (I) and (II), the molecular weight of S sandwiched between R is not particularly limited, and is preferably at least 600, more preferably from 600 to 20,000. If the molecular weight is at most 600, S cannot be distinguished from the random blocks at the time of measuring the block ratio, and the results of measurement of the block ratio may be affected. That is, it is considered that the boundary between R and S should be clearly distinguished, and the degree of polymerization of S sandwiched between R is preferably at least 6. Further, if the molecular weight exceeds 20,000, it exceeds an entanglement molecular weight (Me) of common polystyrene, and accordingly the hard segment block S sandwiched between the soft segment blocks R may not be incorporated into the soft segment blocks R, S sandwiched between R may not apparently be considered as the soft segment blocks, and physical properties such as the impact strength may not be obtained.

The resin composition of the present invention particularly preferably contains a block copolymer (a) of a vinyl aromatic hydrocarbon and a conjugated diene, which satisfies the following (i) and (ii) and a block copolymer (b) of a vinyl aromatic hydrocarbon and a conjugated diene, which satisfies the following (iii) and (iv).

(i) in gel permeation chromatogram, there is at least one peak with a peak top molecular weight (Mp) of from 105,000 to 250,000, (ii) the content ratio (mass) of the conjugated diene is from 10 to 20%, (iii) in gel permeation chromatogram, there is at least one peak with a peak top molecular weight (Mp) of from 45,000 to 140,000, (iv) the content ratio (mass) of the conjugated diene is from 27 to 40%.

In the above (i) and (iii), the peak top molecular weight (Mp) is obtained from the position of the apex of the peak of the molecular weight distribution obtained by gel permeation chromatography (GPC). In GPC, in a case where there are a plurality of peaks, the peak top molecular weight is a molecular weight with respect to a peak corresponding to a peak having the highest area ratio. Further, in a case where coupling is conducted, in the present invention, the peak top molecular weight means the peak top molecular weight before the coupling.

If the peak top molecular weight (Mp) of the block copolymer (a) is less than 105,000, the impact resistance will be low, and if it exceeds 250,000, the transparency will decrease. The peak top molecular weight (Mp) is preferably from 105,000 to 220,000, particularly preferably from 120,000 to 220,000.

Further, if the peak top molecular weight (Mp) of the block copolymer (b) is less than 45,000, the rigidity or the transparency will be low, and if it exceeds 140,000, the impact strength will decrease. The peak top molecular weight (Mp) is preferably from 45,000 to 120,000, particularly preferably from 60,000 to 120,000.

In the above (ii), if the content ratio (mass) of the conjugated diene in the block copolymer (a) is less than 10%, the impact resistance will be low, and if it exceeds 20%, the rigidity will decrease. The content ratio (mass) of the conjugated diene is preferably from 10 to 18%, particularly preferably from 11 to 18%.

In the above (iv), if the content ratio (mass) of the conjugated diene in the block copolymer (b) is less than 27%, the impact resistance will be low, and if it exceeds 40%, the rigidity will decrease. The content ratio (mass) of the conjugated diene is preferably from 27 to 38%, particularly preferably from 29 to 37%.

The content ratio of the block copolymer (a) and the block copolymer (b) in the resin composition of the present invention is preferably (a)/(b)=15 to 60/40 to 85 (mass ratio). In such (a)/(b), if (a) is less than 15 and (b) exceeds 85, the rigidity or the transparency will decrease. On the other hand, if (a) exceeds 60 and (b) is less than 40, the impact resistance will decrease.

Such (a)/(b) is preferably 15 to 50/50 to 85, particularly preferably 25 to 50/50 to 75.

The resin composition of the present invention may be used as a resin composition blended with another thermoplastic resin. Such a thermoplastic resin may, for example, be a polystyrene polymer, a polyphenylene ether polymer, a polyethylene polymer, a polypropylene polymer, a polybutene polymer, a polyvinyl chloride polymer, a polyvinyl acetate polymer, a polyamide polymer, a thermoplastic polyester polymer, a polyacrylate polymer, a polyphenoxy polymer, a polyphenylene sulfide polymer, a polycarbonate polymer, a polyacetal polymer, a polybutadiene polymer, a thermoplastic polyurethane polymer or a polysulfine polymer. A preferred thermoplastic resin is a polystyrene polymer, such as general purpose polystyrene (GPPS), high impact resistance polystyrene (HIPS), a methyl methacrylate/styrene copolymer, a methacrylic acid/styrene copolymer, an acrylonitrile/styrene copolymer or an acrylonitrile/butadiene/styrene copolymer, and general purpose polystyrene (GPPS) is especially suitable.

The general purpose polystyrene (GPPS) is not specified, and it preferably has a weight average molecular weight Mw of from 180,000 to 400,000 and has a liquid paraffin such as white oil added in an amount of from 0 to 4 mass %.

The blend mass ratio of the resin composition of the present invention to the thermoplastic resin is such that the block copolymer composition/thermoplastic resin is preferably from 20/80 to 80/20, more preferably from 30/70 to 70/30, particularly preferably from 40/60 to 60/40. If the blend mass ratio of the block copolymer composition is less than 20, the impact resistance of the resin composition will decrease, and if it exceeds 80, the rigidity of the resin composition will decrease.

The resin composition of the present invention, or the resin composition containing the above resin composition and the thermoplastic resin, may further contain various additives as the case requires.

That is, for the purpose of preventing deterioration of physical properties when the resin composition is subjected to heat treatment, or when a formed product thereof or the like is used in an oxidizing atmosphere or under irradiation with ultraviolet rays or the like, or for the purpose of further imparting physical properties suitable for the application, for example, additives such as a stabilizer, a lubricant, a processing aid, an antiblocking agent, an antistatic agent, an anti-fogging agent, a weather resistance-improving agent, a softening agent, a plasticizer, a pigment, a mineral oil, a filler and a flame retardant may be added.

The stabilizer may, for example, be a phenol-based antioxidant such as 2-[1-(2-hydroxy-3,5-di-tert-pentylphenyl)ethyl]-4,6-di-tert-pentylphenyl acrylate, 2-tert-butyl-6-(3-tert-butyl-2-hydroxy-5-methylbenzyl)-4-methylphenyl acrylate, octadecyl-3-(3,5-di-tert-butyl-4-hydroxyphenyl)propionate or 2,6-di-tert-butyl-4-methylphenol, or a phosphorus-based antioxidant such as 2,2-methylenebis(4,6-di-tert-butylphenyl)octyl phosphite, tris(nonylphenyl)phosphite or bis(2,6-di-tert-butyl-4-methylphenyl)pentaerythritol-diphosphite.

Further, as the lubricant, the processing aid, the antiblocking agent, the antistatic agent, the anti-fogging agent or the like, a saturated fatty acid such as palmitic acid, stearic acid or behenic acid, a fatty acid ester or a pentaerythritol fatty acid ester such as octyl palmitate or octyl stearate, or a fatty acid amide such as erucamide, oleamide, octadecanamide or docosanamide, or ethylenebisoctadecanamide, or glycerin mono-fatty acid ester, glycerin di-fatty acid ester, or a sorbitan fatty acid ester such as sorbitan monopalmitate or sorbitan monostearate, a higher alcohol represented by myristyl alcohol, cetyl alcohol or stearyl alcohol, or high impact polystyrene (HIPS) may, for example, be mentioned.

Further, the weather resistance-improving agent may, for example, be a benzotriazole-based compound such as 2-(2'-hydroxy-3'-tert-butyl-5'-methylphenyl)-5-chlorobenzotriazole, a salicylate-based compound such as 2,4-di-tert-butyl-phenyl-3',5'-di-tert-butyl-4'-hydroxybenzoate, a benzophenone-based ultraviolet absorber such as 2-hydroxy-4-n-octoxybenzophenone, or a hindered amine-based weather resistance-improving agent such as tetrakis(2,2,6,6-tetramethyl-4-piperidyl)-1,2,3,4-butanetetracarboxylate.

Further, a liquid paraffin such as white oil or mineral oil, a silicone oil or a microcrystalline wax may, for example, be added.

Such an additive is used in an amount of preferably at most 7 mass %, more preferably at most 5 mass %, particularly preferably from 0 to 3 mass % in the resin composition of the present invention.

A method of mixing the respective components to obtain the resin composition of the present invention is not particularly limited, and dry blending by a Henschel mixer, a ribbon blender, a V blender or the like may be conducted, or the components may be melted and pelletized by an extruder. Further, the components may be added at the time of producing the polymer, before the start of polymerization, in the middle of the polymerization reaction, in the post-treatment of the polymer, etc.

The resin composition of the present invention may be readily formed by an optional known forming method, for example, by extrusion, injection molding or blow molding, into a variety of practically useful products such as a product by extrusion, a product by injection molding, a product by blow molding, a product by pressure forming, a product by vacuum forming and a product by biaxial orientation, in various shapes including a sheet and a film.

EXAMPLES

Now, the present invention will be described in further detail with reference to Examples. However, it should be understood that the present invention is by no means restricted to such specific Examples.

Polymerization Example 1

A block copolymer of styrene and 1,3-butadiene was produced by the following steps (1) to (12).

(1) Into a reactor, 500.0 kg of cyclohexane and 75.0 g of tetrahydrofuran (THF) were put.

(2) Into the reactor, 1,400 mL (milliliter) of a 10 mass % cyclohexane solution of n-butyllithium as a polymerization initiator solution was added, and the temperature was kept at 30° C.

(3) 10.0 kg of styrene was added, the internal temperature was raised to 80° C., and styrene was subjected to anionic polymerization.

(4) After styrene was completely consumed, while the internal temperature of the reaction system was kept at 80° C., styrene in a total amount of 2.3 kg and 1,3-butadiene in a total amount of 9.3 kg were added simultaneously at constant addition rates of 25.0 kg/h (hour) and 100.0 kg/h, respectively.

(5) After styrene and 1,3-butadiene were completely consumed, while the internal temperature of the reaction system was kept at 80° C., 2.4 kg of styrene was added and subjected to anionic polymerization.

(6) After styrene was completely consumed, while the internal temperature of the reaction system was kept at 80° C., styrene in a total amount of 2.3 kg and 1,3-butadiene in a total amount of 9.3 kg were added simultaneously at constant addition rates of 25.0 kg/h and 100.0 kg/h, respectively.

(7) After styrene and 1,3-butadiene were completely consumed, while the internal temperature of the reaction system was kept at 80° C., 2.4 kg of styrene was added and subjected to anionic polymerization.

(8) After styrene was completely consumed, while the internal temperature of the reaction system was kept at 80° C., styrene in a total amount of 2.3 kg and 1,3-butadiene in a total amount of 9.3 kg were added simultaneously at constant addition rates of 25.0 kg/h and 100.0 kg/h, respectively.

(9) After styrene and 1,3-butadiene were completely consumed, the internal temperature of the reaction system was decreased to 55° C., and 75.2 kg of styrene was added and subjected to anionic polymerization. The internal temperature increased to 90° C.

(10) After styrene was completely consumed, the internal temperature of the reaction system was decreased to 55° C., and 75.2 kg of styrene was added all at once, and the polymerization was completed.

(11) Finally, all the polymer active terminals were deactivated by water to obtain a polymer solution containing a polymer having a structure S—(R—S)$_2$—R—S having polystyrene blocks and random blocks of styrene and butadiene (in the above formula, S represents a polystyrene block, and R represents a random block of styrene and butadiene).

(12) The polymer solution was devolatilized to obtain a block copolymer in Polymerization Example 1. The peak top molecular weight (Mp) was 166,000, and Mw/Mn was 1.01.

The essential points in Polymerization Example 1 are shown in Table 1.

Polymerization Examples 2 to 12

In Polymerization Example 1, the composition of the block copolymer can be determined by adjusting the amounts of the monomers used in the above steps (3) to (10), and the molecular weight can be determined by adjusting the amount of n-butyllithium used in the above step (2). Accordingly, block copolymers in Polymerization Examples 2 to 12 were obtained in the same manner as in Polymerization Example 1 except for the conditions as identified in Table 1.

The essential points in Polymerization Examples 2 to 12 are shown in Table 1.

Polymerization Example 13

A block copolymer of styrene and 1,3-butadiene was produced by the following steps (1) to (11).

(1) Into a reactor, 500.0 kg of cyclohexane and 75.0 g of THF were put.

(2) Into the reactor, 3,600 mL of a 10 mass % cyclohexane solution of n-butyllithium as a polymerization initiator solution was added, and the temperature was kept at 30° C.

(3) 26.0 kg of styrene was added, the internal temperature was raised to 80° C., and styrene was subjected to anionic polymerization.

(4) After styrene was completely consumed, while the internal temperature of the reaction system was kept at 80° C., styrene in a total amount of 5.8 kg and 1,3-butadiene in a total amount of 23.4 kg were added simultaneously at constant addition rates of 25.0 kg/h and 100.0 kg/h, respectively.

(5) After styrene and 1,3-butadiene were completely consumed, while the internal temperature of the reaction system was kept at 80° C., 6.2 kg of styrene was added and subjected to anionic polymerization.

(6) After styrene was completely consumed, while the internal temperature of the reaction system was kept at 80° C., styrene in a total amount of 5.8 kg and 1,3-butadiene in a total amount of 23.4 kg were added simultaneously at constant addition rates of 25.0 kg/h and 100.0 kg/h, respectively.

(7) After styrene and 1,3-butadiene were completely consumed, while the internal temperature of the reaction system was kept at 80° C., 6.2 kg of styrene was added and subjected to anionic polymerization.

(8) After styrene was completely consumed, while the internal temperature of the reaction system was kept at 80° C., styrene in a total amount of 5.8 kg and 1,3-butadiene in a total amount of 23.4 kg were added simultaneously at constant addition rates of 25.0 kg/h and 100.0 kg/h, respectively.

(9) After styrene and 1,3-butadiene were completely consumed, the internal temperature of the reaction system was decreased to 55° C., and 74.0 kg of styrene was added all at once, and the polymerization was completed.

(10) Finally, all the polymer active terminals were deactivated by water to obtain a polymer solution containing a polymer having a structure S—(R—S)$_2$—R—S having polystyrene blocks and random blocks of styrene and butadiene.

(11) The polymer solution was devolatilized to obtain a block copolymer in Polymerization Example 13. The peak top molecular weight (Mp) was 69,000, and Mw/Mn was 1.06.

The essential points in Polymerization Example 13 are shown in Table 2.

Polymerization Examples 14 to 29

In Polymerization Example 13, the composition of the block copolymer can be determined by adjusting the amounts of the monomers used in the above steps (3) to (9), and the molecular weight can be determined by adjusting the amount n-butyllithium used in the step (2).

Accordingly, block copolymers in Polymerization Examples 14 to 29 were obtained in the same manner as in Polymerization Example 13 except for the conditions as identified in Table 2.

The block copolymer in Polymerization Example 28 is a block copolymer having a structure S—(B—S)$_2$—B—S, having polystyrene blocks and polybutadiene blocks, and having no random structure. In the above formula, S represents a polystyrene block, and B represents a polybutadiene block.

The essential points in Polymerization Examples 14 to 29 are shown in Table 2.

Polymerization Example 30

A block copolymer of styrene and 1,3-butadiene was produced by the following steps (1) to (13).

(1) Into a reactor, 500.0 kg of cyclohexane and 75.0 g of THF were put.

(2) Into the reactor, 1,910 mL of a 10 mass % cyclohexane solution of n-butyllithium as a polymerization initiator solution was added, and the temperature was kept at 30° C.

(3) 75.2 kg of styrene was added and subjected to anionic polymerization. The internal temperature increased to 63° C.

(4) After styrene was completely consumed, the internal temperature of the reaction system was decreased to 50° C., and 75.2 kg of styrene was added and subjected to anionic polymerization. The internal temperature increased to 84° C.

(5) After styrene was completely consumed, while the internal temperature of the reaction system was kept at 80° C., styrene in a total amount of 2.0 kg and 1,3-butadiene in a total amount of 8.0 kg were added simultaneously at constant addition rates of 25.0 kg/h and 100.0 kg/h, respectively.

(6) After styrene and 1,3-butadiene were completely consumed, while the internal temperature of the reaction system was kept at 80° C., 4.8 kg of styrene was added and subjected to anionic polymerization.

(7) After styrene was completely consumed, while the internal temperature of the reaction system was kept at 80° C., styrene in a total amount of 2.0 kg and 1,3-butadiene in a total amount of 8.0 kg were added simultaneously at constant addition rates of 25.0 kg/h and 100.0 kg/h, respectively.

(8) After styrene and 1,3-butadiene were completely consumed, while the internal temperature of the reaction system was kept at 80° C., 4.8 kg of styrene was added and subjected to anionic polymerization.

(9) After styrene was completely consumed, while the internal temperature of the reaction system was kept at 80° C., styrene in a total amount of 2.0 kg and 1,3-butadiene in a total amount of 8.0 kg were added simultaneously at constant addition rates of 25.0 kg/h and 100.0 kg/h, respectively.

(10) After styrene and 1,3-butadiene were completely consumed, the internal temperature of the reaction system was decreased to 79° C., and 10.0 kg of styrene was added and subjected to anionic polymerization. The internal temperature increased to 84° C.

(11) After styrene was completely consumed, the internal temperature of the reaction system was decreased to 75° C., 149 g of epoxidized soybean oil as a coupling agent diluted with 2.5 kg of cyclohexane was added, and the polymerization was completed.

(12) Finally, all the polymer active terminals were deactivated by water to obtain a polymer solution containing a polymer having a structure (S—(R—S)$_2$—R—S)m-X obtained by coupling a polymer having polystyrene blocks and random blocks of styrene and butadiene. In the formula, S represents a polystyrene block, R represents a random block of styrene and butadiene, and X represents a residue of the coupling agent.

(13) This polymer solution was devolatilized to obtain a block copolymer in Polymerization Example 30. The peak top molecular weight (Mp) after coupling was 111,000, and Mw/Mn after coupling was 1.53.

The essential points in Polymerization Example 30 are shown in Table 3.

Polymerization Example 31

In Polymerization Example 30, the composition of the block copolymer can be determined by adjusting the amounts of the monomers used in the above steps (3) to (10), the molecular weight can be determined by adjusting the amount of n-butyllithium used in the step (2), and Mw/Mn after coupling can be determined by adjusting the amount of epoxidized soybean oil used in the above step (11).

Accordingly, a block copolymer in Polymerization Example 31 was obtained in the same manner as in Polymerization Example 30 except for the conditions as identified in Table 3.

The essential points in Polymerization Example 31 are shown in Table 3.

Polymerization Example 32

(1) Into a reactor, 500.0 kg of cyclohexane and 75.0 g of THF were put.

(2) Into the reactor, 1,280 mL of a 10 mass % cyclohexane solution of n-butyllithium as a polymerization initiator solution was added, and the temperature was kept at 30° C.

(3) 10.0 kg of styrene was added, the internal temperature was raised to 80° C., and styrene was subjected to anionic polymerization.

(4) After styrene was completely consumed, while the internal temperature of the reaction system was kept at 80° C., styrene in a total amount of 15.6 kg and 1,3-butadiene in a total amount of 24.0 kg were added simultaneously at constant addition rates of 60.0 kg/h and 90.0 kg/h, respectively.

(5) After styrene and 1,3-butadiene were completely consumed, the internal temperature of the reaction system was decreased to 55° C., and 75.2 kg of styrene was added and subjected to anionic polymerization. The internal temperature increased to 91° C.

(6) After styrene was completely consumed, the internal temperature of the reaction system was decreased to 55° C., and 75.2 kg of styrene was added all at once, and the polymerization was completed.

(7) Finally, all the polymer active terminals were deactivated by water to obtain a polymer solution containing a polymer having a structure S—R—S having polystyrene blocks and random blocks of styrene and butadiene.

(8) The polymer solution was devolatilized to obtain a block copolymer in Polymerization Example 32. The peak top molecular weight (Mp) was 184,000, and Mw/Mn was 1.02.

The essential points in Polymerization Example 32 are shown in Table 4.

Polymerization Examples 33 and 34

In Polymerization Example 32, the composition of the block copolymer can be determined by adjusting the amounts of the monomers used in the above steps (3) to (6), and the molecular weight can be determined by adjusting the amount of n-butyllithium used in the step (2).

Accordingly, block copolymers in Polymerization Examples 33 and 34 are obtained in the same manner as in Polymerization Example 32 except for the conditions as identified in Table 4.

The essential points in Polymerization Examples 33 and 34 are shown in Table 4.

Polymerization Example 35

A block copolymer of styrene and 1,3-butadiene was produced by the following steps (1) to (10).

(1) Into a reactor, 500.0 kg of cyclohexane and 75.0 g of THF were put.

(2) Into the reactor, 1,290 mL of a 10 mass % cyclohexane solution of n-butyllithium as a polymerization initiator solution was added, and the temperature was kept at 30° C.

(3) 10.0 kg of styrene was added and subjected to anionic polymerization. The internal temperature increased to 38° C.

(4) After styrene was completely consumed, the internal temperature of the reaction system was raised to 50° C., 8.0 kg of 1,3-butadiene and 5.2 kg of styrene were added simultaneously and subjected to anionic polymerization. The internal temperature increased to 75° C.

(5) After 1,3-butadiene and styrene were completely consumed, the internal temperature of the reaction system was decreased to 50° C., and 8.0 kg of 1,3-butadiene and 5.2 kg of styrene were added simultaneously and subjected to anionic polymerization. The internal temperature increased to 74° C.

(6) After 1,3-butadiene and styrene were completely consumed, the internal temperature of the reaction system was decreased to 50° C., and 8.0 kg of 1,3-butadiene and 5.2 kg of styrene were added simultaneously and subjected to anionic polymerization. The internal temperature increased to 76° C.

(7) After 1,3-butadiene and styrene were completely consumed, the internal temperature of the reaction system was decreased to 55° C., and 75.2 kg of styrene was added and subjected to anionic polymerization. The internal temperature was raised to 90° C.

(8) After styrene was completely consumed, the internal temperature of the reaction system was decreased to 55° C., and 75.2 kg of styrene was added all at once, and the polymerization was completed.

(9) Finally, all the polymer active terminals were deactivated by water to obtain a polymer solution containing a polymer having a structure S-T-T-T-S (wherein S represents a polystyrene block, and T represents a tapered block of styrene and butadiene) having polystyrene blocks and tapered blocks of styrene and butadiene.

(10) The polymer solution was devolatilized to obtain a block copolymer in Polymerization Example 35. The peak top molecular weight (Mp) was 189,000, and Mw/Mn was 1.04.

The essential points in Polymerization Example 35 are shown in Table 5.

Polymerization Example 36

In Polymerization Example 35, the composition of the block copolymer can be determined by adjusting the amounts of the monomers used in the above steps (3) to (8), and the molecular weight can be determined by adjusting the amount of n-butyllithium used in the above step (2). Accordingly, a block copolymer in Polymerization Example 36 was obtained in the same manner as in Polymerization Example 35 except for the conditions as identified in Table 5.

The essential points in Polymerization Example 36 are shown in Table 5.

Polymerization Example 37

A block copolymer of styrene and 1,3-butadiene was produced by the following steps (1) to (10).

(1) Into a reactor, 500.0 kg of cyclohexane and 75.0 g of tetrahydrofuran (THF) were put.

(2) Into the reactor, 1,230 mL of a 10 mass % cyclohexane solution of n-butyllithium as a polymerization initiator solution was added, and the temperature was kept at 30° C.

(3) 10.0 kg of styrene was added, the internal temperature was raised to 80° C., and styrene was subjected to anionic polymerization.

(4) After styrene was completely consumed, while the internal temperature of the reaction system was kept at 80° C., styrene in a total amount of 3.0 kg and 1,3-butadiene in a total amount of 12.0 kg were added simultaneously at constant addition rates of 25.0 kg/h and 100.0 kg/h, respectively.

(5) After styrene and 1,3-butadiene were completely consumed, while the internal temperature of the reaction system was kept at 80° C., 9.6 kg of styrene was added and subjected to anionic polymerization.

(6) After styrene was completely consumed, while the internal temperature of the reaction system was kept at 80° C., styrene in a total amount of 3.0 kg and 1,3-butadiene in a total amount of 12.0 kg were added simultaneously at constant addition rates of 25.0 kg/h and 100.0 kg/h, respectively.

(7) After styrene and 1,3-butadiene were completely consumed, the internal temperature of the reaction system was decreased to 55° C., and 75.2 kg of styrene was added and subjected to anionic polymerization. The internal temperature increased to 90° C.

(8) After styrene was completely consumed, the internal temperature of the reaction system was decreased to 55° C., and 75.2 kg of styrene was added all at once, and the polymerization was completed.

(9) Finally, all the polymer active terminals were deactivated by water to obtain a polymer solution containing a polymer having a structure S—(R—S)$_1$—R—S having polystyrene blocks and random blocks of styrene and butadiene.

(10) The polymer solution was devolatilized to obtain a block copolymer in Polymerization Example 37. The peak top molecular weight (Mp) was 187,000, and Mw/Mn was 1.03.

The essential points in Polymerization Example 37 are shown in Table 6.

Polymerization Example 38

In Polymerization Example 37, the composition of the block copolymer can be determined by adjusting the amounts of the monomers used in the above steps (3) to (8), and the molecular weight can be determined by adjusting the amount of n-butyllithium used in the above step (2). Accordingly, a block copolymer in Polymerization Example 38 was obtained in the same manner as in Polymerization Example 37 except for the conditions as identified in Table 6.

The essential points in Polymerization Example 38 are shown in Table 6.

Polymerization Example 39

A block copolymer of styrene and 1,3-butadiene was produced by the following steps (1) to (14).

(1) Into a reactor, 500.0 kg of cyclohexane and 75.0 g of THF were put.

(2) Into the reactor, 1,210 mL of a 10 mass % cyclohexane solution of n-butyllithium as a polymerization initiator solution was added, and the temperature was kept at 30° C.

(3) 10.0 kg of styrene was added, the internal temperature was raised to 80° C., and styrene was subjected to anionic polymerization.

(4) After styrene was completely consumed, while the internal temperature of the reaction system was kept at 80° C., styrene in a total amount of 1.5 kg and 1,3-butadiene in a total amount of 6.0 kg were added simultaneously at constant addition rates of 25.0 kg/h and 100.0 kg/h, respectively.

(5) After styrene and 1,3-butadiene were completely consumed, while the internal temperature of the reaction system was kept at 80° C., 3.2 kg of styrene was added and subjected to anionic polymerization.

(6) After styrene was completely consumed, while the internal temperature of the reaction system was kept at 80° C., styrene in a total amount of 1.5 kg and 1,3-butadiene in a total amount of 6.0 kg were added simultaneously at constant addition rates of 25.0 kg/h and 100.0 kg/h, respectively.

(7) After styrene and 1,3-butadiene were completely consumed, while the internal temperature of the reaction system was kept at 80° C., 3.2 kg of styrene was added and subjected to anionic polymerization.

(8) After styrene was completely consumed, while the internal temperature of the reaction system was kept at 80° C., styrene in a total amount of 1.5 kg and 1,3-butadiene in a total amount of 6.0 kg were added simultaneously at constant addition rates of 25.0 kg/h and 100.0 kg/h, respectively.

(9) After styrene and 1,3-butadiene were completely consumed, while the internal temperature of the reaction system was kept at 80° C., 3.2 kg of styrene was added and subjected to anionic polymerization.

(10) After styrene was completely consumed, while the internal temperature of the reaction system was kept at 80° C., styrene in a total amount of 1.5 kg and 1,3-butadiene in a total amount of 6.0 kg were added simultaneously at constant addition rates of 25.0 kg/h and 100.0 kg/h, respectively.

(11) After styrene and 1,3-butadiene were completely consumed, the internal temperature of the reaction system was decreased to 55° C., and 75.2 kg of styrene was added and subjected to anionic polymerization. The internal temperature increased to 92° C.

(12) After styrene was completely consumed, the internal temperature of the reaction system was decreased to 55° C., and 75.2 kg of styrene was added all at once, and the polymerization was completed.

(13) Finally, all the polymer active terminals were deactivated by water to obtain a polymer solution containing a polymer having a structure S—(R—S)$_3$—R—S having polystyrene blocks and random blocks of styrene and butadiene.

(14) The polymer solution was devolatilized to obtain a block copolymer in Polymerization Example 39. The peak top molecular weight (Mp) was 185,000, and Mw/Mn was 1.04.

The essential points in the above Polymerization Example 39 are shown in Table 7.

Polymerization Example 40

In Polymerization Example 39, the composition of the block copolymer can be determined by adjusting the amounts of the monomers used in the above steps (3) to (12), and the molecular weight can be determined by adjusting the amount of n-butyllithium used in the above step (2). Accordingly, a block copolymer in Polymerization Example 40 was obtained in the same manner as in Polymerization Example 39 except for the conditions as identified in Table 7.

The essential points in Polymerization Example 40 are shown in Table 7.

Blend Examples

Blend Examples 1 to 37

The block copolymers obtained in Polymerization Examples 1 to 40 were mixed in a blend ratio (mass ratio) as identified in Table 8 by a Henschel mixer to produce a block copolymer resin composition. The block copolymer resin composition was melt-kneaded and extruded into strands by a monoaxial extruder (manufactured by TABATA Industrial Machinery Co., Ltd., HV-40-30, φ40 mm) at an extrusion temperature of 200° C. at a screw speed of 100 rpm, and the strands were cooled and pelletized by a pelletizer.

Of the block copolymer resin compositions in Blend Examples 1 to 37, the blend composition, the conjugated diene content mass ratio, the block ratio of the vinyl aromatic hydrocarbon of styrene, Mw/Mn, the tan δ peak temperature and tan δ (max+30° C.)/tan δ (max) are shown in Table 8.

<Measurement of Molecular Weight and Degree of Dispersion Mw/Mn>

Gel permeation chromatography (GPC) was employed. In the present invention, unless otherwise specified, the molecular weight means the peak top molecular weight Mp, and is Mp before coupling in a case where coupling was conducted. Further, the degree of dispersion means the weight average molecular weight Mw/number average molecular weight Mn, and is Mw/Mn after coupling in a case where coupling is conducted.

GPC apparatus: "HLC-8220GPC" manufactured by Tosoh Corporation, column: four "ShodexGPCKF-404" columns manufactured by Showa Denko K.K. connected in series, column temperature: 40° C., detection method: differential refractive index method, mobile phase: tetrahydrofuran, sample concentration: 2 mass %, analytical curve: prepared by using standard polystyrene manufactured by VARIAN (peak top molecular weight Mp=2,560,000, 841,700, 280,500, 143,400, 63,350, 31,420, 9,920 and 2,930).

<Butadiene Content Ratio (Mass) in Resin Composition>

The conjugated diene content ratio in the block copolymer resin composition was calculated from the amount of 1,3-butadiene used and the blend ratio based on the total amount of monomers used in each Polymerization Example.

<Block Ratio of Styrene in Resin Composition>

$^1$H-NMR was measured by means of nuclear magnetic resonance (NMR) and the block ratio was calculated. A value obtained by calculating an integrated value of peak intensities at from 6.2 to 6.8 ppm attributable to two protons added on the ortho-position among five protons added to the aromatic ring of polystyrene, as a value of five protons, was taken as the block-form styrene amount W.

Further, a value obtained by subtracting an integrated value of the peak intensity of deuterated chloroform from an integrated value of peak intensities at from 6.2 to 7.6 ppm including an integrated value of peak intensities at from 6.8 to 7.6 ppm attributable to three protons added on the para- and meta-positions, is taken as the total styrene amount (total vinyl aromatic hydrocarbon amount) WO.

The block ratio was calculated by substituting the obtained W and WO into the following equation. The block-form styrene amount (block-form vinyl aromatic hydrocarbon amount) W is the amount of a chain consisting of at least 5 monomer units for reasons of sensitivity of the apparatus.

$$\text{Styrene block ratio (\%)} = (W/WO) \times 100$$

Nuclear magnetic resonance apparatus: AVANCE-300, manufactured by BRUKER BIOSPIN Nuclear species: $^{1}$H, resonance frequency: 300 MHz($^{1}$H), measurement solvent: $CDCl_3$ <tan δ Peak Temperature and (tan δ (Max+30° C.)/tan δ (Max))>

They were determined by dynamic viscoelasticity measurement (chart). The loss tangent (tan δ) was determined by measurement, and among tan δ local maximum values within a temperature range of from −90 to −30° C., the maximum value is taken as "tan δ (max)", and the temperature at the maximum value was taken as "tan δ peak temperature". Further, tan δ at a temperature higher by 30° C. than the tan δ peak temperature is taken as "tan δ (max+30° C.)", and (tan δ (max+30° C.)/tan δ (max)) was calculated.

<Dynamic Viscoelasticity Measurement>

Using the following apparatus, a stress in a tensile direction at a frequency of 1 Hz and strain were applied to a test sample, and while the temperature was raised at a rate of 4° C./min, the storage elastic modulus (E'), the loss elastic modulus (E") and the loss tangent (tan δ) were measured (here, tan δ=E"/E'). The sample of the resin composition for dynamic viscoelasticity measurement was held as pressurized at from 200 to 220° C. for 2 minutes by hot pressing, to relax the orientation, and then rapidly cooled to form a 0.6 mm thickness sheet in a non-oriented state. Then, the sample was stored in a room adjusted at a temperature of 23° C. under a relative humidity of 50% RH for at least 24 hours and then used.

Dynamic viscoelasticity measurement apparatus: RSA3, manufactured by TA Instruments Japan Inc.

Temperature range: −120 to 130° C., temperature-raising rate: 4° C./min,

Measurement frequency: 1 Hz

It is found from Blend Examples 22 and 23, the conjugated diene mass ratio can be reduced by 4% by repeating fandom blocks and polystyrene blocks, without changing the block ratio and the tan δ peak temperature. On that occasion, it was found that tan δ (max+30° C.)/tan δ (max) is at least 0.6.

It is found from Blend Examples 7 and 25 that the block ratio, the tan δ peak temperature and tan δ (max+30° C.)/tan δ (max) differ between in a case where the conjugated diene mass ratio in the block copolymer resin composition is fixed and the random blocks and the polystyrene blocks are repeated, and in a case where the blocks are not repeated and the styrene/1,3-butadiene ratio in the random block is changed.

It is found from Blend Examples 7 and 35 that the block ratio and tan δ (max+30° C.)/tan δ (max) differ between in a case where the conjugated diene mass ratio in the block copolymer resin composition is fixed and the random blocks and the polystyrene blocks are repeated, and in a case where the tapered blocks are repeated.

Examples 1 to 29, Comparative Examples 1 to 10 and Reference Example 1

(Preparation of GPPS Blend Sheet)

The block copolymer resin composition and GPPS were mixed in a blend ratio as identified in each of Tables 9 to 11 and formed into a sheet by the following procedure. Using a φ40 mm single screw extruder (VS40-26) manufactured by TANABE PLASTICS MACHINERY CO., LTD., having a T die with a width of 40 cm attached at its tip, sheet extrusion was conducted using the resin in each Blend Example at an extrusion temperature of 200° C., at a T die temperature of 200° C. at a screw speed of 60 rpm, and using a 480 type sheeting apparatus manufactured by TANABE PLASTICS MACHINERY CO., LTD., a monolayer sheet having a sheet thickness of 0.6 mm was prepared at a rooling roll temperature of 50° C. The sheet thickness was adjusted by the lip gap of the die, and the sheet withdraw ratio was constant. The resins used are shown in Tables 9 to 11.

As GPPS, general purpose polystyrene resin (manufactured by TOYO STYRENE Co., Ltd., TOYO STYROL GP G200C, peak top molecular weight (Mp): 286,000, Mw/Mn: 2.53) was used.

<Sheet Impact>

The sheet impact was measured by using an impact tester (manufactured by TESTER SANGYO CO., LTD.) and using an impact core having a tip diameter of 12.7 mm. The other measurement conditions were in accordance with ASTM D3420. A case where the sample was not punched is represented as ">5.0".

<Du Pont Impact Strength>

Using a Du Pont impact tester (manufactured by TOYO SEIKI SEISAKU-SHO, LTD.), twenty 60 mm square test pieces cut out from the sheet were placed on a receiver, an impact core having a tip diameter of 6.35 mm was placed on the test piece, a 100 g weight was dropped on the upper end of the impact core, and whether the sheet was broken or not was visually determined, and the Du Pont impact strength was obtained as calculated as the energy value. Before this measurement, an approximate height of the weight to break the sheet was determined by two or three preliminary test pieces, and the first test piece was subjected to the measurement from the height determined by the preliminary measurement, and the second and subsequent test pieces were subjected to the measurement based on the previous measurement result, from a height higher by 5 cm in a case where the sheet was not broken, or a height lower by 5 cm when the sheet was broken. Such operation was continuously conducted 20 times, and the Du Pont impact strength was determined in accordance with the following formulae from the height of the weight and whether the sheet was broken or not with respect to each test piece.

X=the sum of (the height×the number of A)/the number of A (m), A: sheet not broken Y=the sum of (the height×the number of B)/the number of B (m), B: sheet broken Z=(X+Y)/2(m)

Du Pont impact strength (J)=0.1 (kg)×9.8 (m/s²)×Z (m)

<Folding Strength>

Using a MIT folding strength fatigue tester (MIT-DA manufactured by TOYO SEIKI SEISAKU-SHO, LTD.), with respect to samples cut into 100 mm×10 mm or 10 mm×100 mm in MD direction×TD direction, measurement was conducted 6 times with respect to each sample, and the average was taken. Measurement was conducted at a folding angle of 45° in right and left directions, at a folding number of 175 times/min under a load of 1 kg. A case where the average folding times exceeded 5,000 times is represented as ">5,000".

<Elastic Modulus in Tension>

Using a tensilon universal testing instrument RTC-1210A manufactured by A and D Company, Limited, a dumbbell-shaped test piece with JIS K6732 was cut from the sheet so that the MD direction is in the longitudinal direction, and the test piece was pulled in the MD direction with an initial distance between chucks of 50 mm, at a pulling rate of 10 mm/min at 23° C. to measure the elastic modulus in tension, and the average of measurement results of 7 times was taken as the measured value.

<Transparency>

The transparency was measured by suing a turbidimeter (NHD2000 manufactured by NIPPON DENSHOKU INDUSTRIES CO., LTD.) in accordance with JIS K7136, and the haze was shown.

It is found from Examples 1 to 3 and Comparative Examples 1, 2 and 9 that the impact strength is low if the conjugated diene content ratio in the resin composition is less than 22%, and the rigidity is low and the transparency decreases if it exceeds 32%.

It is found from Examples 4 and 5 and Comparative Examples 3 and 4 that the impact strength is low if the block ratio of the vinyl aromatic hydrocarbon in the resin composition is less than 90%, and the rigidity is low and the transparency decreases if it exceeds 98%.

It is found from Examples 6 to 11 and Comparative Examples 5 and 6 that the impact strength is low if Mw/Mn in the resin composition is less than 1.1, and the impact strength is low in some Examples and the transparency decreases if it exceeds 1.6.

It is found from Examples 7 and Comparative Examples 7 and 8 that the impact strength decreases if "tan δ (max+30° C.)/tan δ (max)" of the resin composition is less than 0.6.

It is found from Examples 6 to 11 and Comparative Examples 5 and 6 that physical properties are not affected by whether coupling is conducted or not for the block copolymer in the resin composition, and only part of the block copolymer in the resin composition may be subjected to coupling.

It is found from Examples 3, 13 and 23 and Comparative Example 2 that the rigidity is low and the transparency remarkably decreases if (a) is less than 15 and (b) exceeds 85 in the mass ratio (a)/(b) of the block copolymer. On the other hand, the impact strength slightly decreases if (a) exceeds 60 and (b) is less than 40.

It is found from Examples 14, 15, 24 and 25 that the impact strength is slightly low if the peak top molecular weight (Mp) of the block copolymer is less than 105,000, and the transparency decreases if it exceeds 250,000.

It is found from Examples 16, 17, 26 and 27 that the transparency decreases if the peak top molecular weight (Mp) of the block copolymer is less than 45,000.

It is found from Comparative Example 5 and Reference Example 1 that the rigidity and the transparency improve, and the amount of 1,3-butadiene used can be reduced by 4% while the impact strength is maintained, by repeating the random blocks and the polystyrene blocks.

It is found from Example 7 and Comparative Example 7 that the transparency and the impact strength improve by repeating the random blocks and the polystyrene blocks.

It is considered to be because the polystyrene block sandwiched between the random blocks is apparently incorporated into the random blocks and functions as a soft segment, and Tg on the low temperature side (tan δ peak temperature) does not change, the function as the soft segment is not impaired and as a result, the impact strength improves.

It is found from Example 7 and Comparative Example 10 that the impact resistance is inferior to a case where the random blocks and the polystyrene blocks are repeated, even if the tapered blocks are repeated. That is, it is considered that the random blocks and the polystyrene blocks should be clearly distinguished.

TABLE 1

| Polymerization Example 1 No. | | | 1 | 2 | 3 | 4 | 5 | 6 | 7 | 8 | 9 | 10 | 11 | 12 |
|---|---|---|---|---|---|---|---|---|---|---|---|---|---|---|
| (1) | Cyclohexane | kg | 500 | 500 | 500 | 500 | 500 | 500 | 500 | 500 | 500 | 500 | 500 | 500 |
|  | THF | g | 75 | 75 | 75 | 75 | 75 | 75 | 75 | 75 | 75 | 75 | 75 | 75 |
| (2) | n-butyllithium | ml | 1400 | 1370 | 1240 | 1220 | 1180 | 1260 | 1300 | 860 | 950 | 2150 | 2430 | 1100 |
| (3) | Styrene | kg | 10.0 | 10.0 | 10.0 | 10.0 | 10.0 | 10.0 | 10.0 | 10.0 | 10.0 | 10.0 | 10.0 | 10.0 |
| (4) | Styrene | kg | 2.3 | 2.0 | 2.0 | 1.3 | 1.7 | 3.3 | 4.3 | 2.0 | 2.0 | 2.0 | 2.0 | 2.0 |
|  | addition rate | kg/h | 25 | 25 | 25 | 25 | 25 | 25 | 25 | 25 | 25 | 25 | 25 | 25 |
|  | 1,3-butadiene | kg | 9.3 | 8.0 | 8.0 | 5.4 | 6.7 | 13.3 | 17.3 | 8.0 | 8.0 | 8.0 | 8.0 | 8.0 |
|  | addition rate | kg/h | 100 | 100 | 100 | 100 | 100 | 100 | 100 | 100 | 100 | 100 | 100 | 100 |
| (5) | Styrene | kg | 2.4 | 4.8 | 4.8 | 9.8 | 7.2 | 2.4 | 2.4 | 4.8 | 4.8 | 4.8 | 4.8 | 4.8 |
| (6) | Styrene | kg | 2.3 | 2.0 | 2.0 | 1.3 | 1.7 | 3.3 | 4.3 | 2.0 | 2.0 | 2.0 | 2.0 | 2.0 |
|  | addition rate | kg/h | 25 | 25 | 25 | 25 | 25 | 25 | 25 | 25 | 25 | 25 | 25 | 25 |
|  | 1,3-butadiene | kg | 9.3 | 8.0 | 8.0 | 5.4 | 6.7 | 13.3 | 17.3 | 8.0 | 8.0 | 8.0 | 8.0 | 8.0 |
|  | addition rate | kg/h | 100 | 100 | 100 | 100 | 100 | 100 | 100 | 100 | 100 | 100 | 100 | 100 |
| (7) | Styrene | kg | 2.4 | 4.8 | 4.8 | 9.8 | 7.2 | 2.4 | 2.4 | 4.8 | 4.8 | 4.8 | 4.8 | 4.8 |

TABLE 1-continued

| Polymerization Example 1 No. | | | 1 | 2 | 3 | 4 | 5 | 6 | 7 | 8 | 9 | 10 | 11 | 12 |
|---|---|---|---|---|---|---|---|---|---|---|---|---|---|---|
| (8) | Styrene | kg | 2.3 | 2.0 | 2.0 | 1.3 | 1.7 | 3.3 | 4.3 | 2.0 | 2.0 | 2.0 | 2.0 | 2.0 |
| | addition rate | kg/h | 25 | 25 | 25 | 25 | 25 | 25 | 25 | 25 | 25 | 25 | 25 | 25 |
| | 1,3-butadiene | kg | 9.3 | 8.0 | 8.0 | 5.4 | 6.7 | 13.3 | 17.3 | 8.0 | 8.0 | 8.0 | 8.0 | 8.0 |
| | addition rate | kg/h | 100 | 100 | 100 | 100 | 100 | 100 | 100 | 100 | 100 | 100 | 100 | 100 |
| (9) | Styrene | kg | 75.2 | 75.2 | 75.2 | 75.2 | 75.2 | 67.7 | 60.2 | 75.2 | 75.2 | 75.2 | 75.2 | 75.2 |
| (10) | Styrene | kg | 75.2 | 75.2 | 75.2 | 75.2 | 75.2 | 67.7 | 60.2 | 75.2 | 75.2 | 75.2 | 75.2 | 75.2 |
| (12) | Mp × $10^{-4}$ | — | 16.6 | 15.6 | 18.4 | 18.5 | 19.2 | 18.8 | 18.7 | 27.9 | 25.0 | 10.5 | 9.3 | 21.1 |
| | Mw/Mn | — | 1.01 | 1.02 | 1.02 | 1.01 | 1.02 | 1.02 | 1.02 | 1.02 | 10.1 | 1.04 | 1.02 | 1.01 |
| Conjugated diene mass ratio | | % | 14.0 | 12.0 | 12.0 | 8.1 | 10.1 | 20.0 | 26.0 | 12.0 | 12.0 | 12.0 | 12.0 | 12.0 | n-Butyllithium: addition amount of 10 mass % cyclohexane solution
Mp: peak top molecular weight,
Mn: number average molecular weight,
Mw: weight average molecular weight.

TABLE 2

| Polymerization Example No. | | | 13 | 14 | 15 | 16 | 17 | 18 | 19 | 20 |
|---|---|---|---|---|---|---|---|---|---|---|
| (1) | Cyclohexane | kg | 500 | 500 | 500 | 500 | 500 | 500 | 500 | 500 |
| | THF | g | 75 | 75 | 75 | 75 | 75 | 75 | 75 | 75 |
| (2) | n-butyllithium | ml | 3600 | 3400 | 3490 | 3510 | 3380 | 2550 | 2030 | 2500 |
| (3) | Styrene | kg | 26.0 | 26.0 | 26.0 | 26.0 | 26.0 | 26.0 | 26.0 | 26.0 |
| (4) | Styrene | kg | 5.8 | 11.7 | 10.2 | 1.3 | 5.0 | 5.0 | 5.0 | 4.3 |
| | addition rate | kg/h | 25 | 47 | 43 | 5 | 25 | 25 | 25 | 25 |
| | 1,3-butadiene | kg | 23.4 | 17.5 | 19.0 | 23.7 | 20.0 | 20.0 | 20.0 | 17.4 |
| | addition rate | kg/h | 100 | 70 | 80 | 91 | 100 | 100 | 100 | 100 |
| (5) | Styrene | kg | 6.2 | 6.2 | 6.2 | 6.2 | 12.5 | 12.5 | 12.5 | 17.5 |
| (6) | Styrene | kg | 5.8 | 11.7 | 10.2 | 1.3 | 5.0 | 5.0 | 5.0 | 4.3 |
| | addition rate | kg/h | 25 | 47 | 43 | 5 | 25 | 25 | 25 | |
| | 1,3-butadiene | kg | 23.4 | 17.5 | 19.0 | 23.7 | 20.0 | 20.0 | 20.0 | 17.4 |
| | addition rate | kg/h | 100 | 70 | 80 | 91 | 100 | 100 | 100 | 100 |
| (7) | Styrene | kg | 6.2 | 6.2 | 6.2 | 12.5 | 12.5 | 12.5 | 12.5 | 17.5 |
| (8) | Styrene | kg | 5.8 | 11.7 | 10.2 | 1.3 | 5.0 | 5.0 | 5.0 | 4.3 |
| | addition rate | kg/h | 25 | 47 | 43 | 5 | 25 | 25 | 25 | 25 |
| | 1,3-butadiene | kg | 23.4 | 17.5 | 19.0 | 23.7 | 20.0 | 20.0 | 20.0 | 17.4 |
| | addition rate | kg/h | 100 | 70 | 80 | 91 | 100 | 100 | 100 | 100 |
| (9) | Styrene | kg | 74.0 | 74.0 | 74.0 | 74.0 | 74.0 | 74.0 | 74.0 | 74.0 |
| (11) | Mp × $10^{-4}$ | — | 6.9 | 7.0 | 6.9 | 7.1 | 7.0 | 9.6 | 11.5 | 9.5 |
| | Mw/Mn | — | 1.06 | 1.05 | 1.05 | 1.06 | 1.06 | 1.06 | 1.01 | 1.02 |
| Conjugated diene mass ratio | | % | 35.1 | 26.3 | 28.5 | 35.6 | 30.0 | 30.0 | 30.0 | 26.1 |

| Polymerization Example No. | | | 21 | 22 | 23 | 24 | 25 | 26 | 27 | 28 | 29 |
|---|---|---|---|---|---|---|---|---|---|---|---|
| (1) | Cyclohexane | kg | 500 | 500 | 500 | 500 | 500 | 500 | 500 | 500 | 500 |
| | THF | g | 75 | 75 | 75 | 75 | 75 | 75 | 75 | 75 | 75 |
| (2) | n-butyllithium | ml | 2520 | 2680 | 2710 | 1580 | 1710 | 5130 | 6080 | 3540 | 2030 |
| (3) | Styrene | kg | 26.0 | 26.0 | 26.0 | 26.0 | 26.0 | 26.0 | 26.0 | 26.0 | 10.0 |
| (4) | Styrene | kg | 4.5 | 6.7 | 7.0 | 5.0 | 5.0 | 5.0 | 5.0 | 0.0 | 4.7 |
| | addition rate | kg/h | 25 | 25 | 25 | 25 | 25 | 25 | 25 | 0 | 25 |
| | 1,3-butadiene | kg | 18.0 | 26.7 | 28.0 | 20.0 | 20.0 | 20.0 | 20.0 | 25.0 | 18.7 |
| | addition rate | kg/h | 100 | 100 | 100 | 100 | 100 | 100 | 100 | 100 | 100 |
| (5) | Styrene | kg | 16.3 | 6.2 | 6.2 | 12.5 | 12.5 | 12.5 | 12.5 | 12.5 | 5.0 |
| (6) | Styrene | kg | 4.5 | 6.7 | 7.0 | 5.0 | 5.0 | 5.0 | 5.0 | 0.0 | 4.6 |
| | addition rate | kg/h | 25 | 25 | 25 | 25 | 25 | 25 | 25 | 0 | 25 |
| | 1,3-butadiene | kg | 18.0 | 26.7 | 28.0 | 20.0 | 20.0 | 20.0 | 20.0 | 25.0 | 18.6 |
| | addition rate | kg/h | 100 | 100 | 100 | 100 | 100 | 100 | 100 | 100 | 100 |
| (7) | Styrene | kg | 16.3 | 6.2 | 6.2 | 12.5 | 12.5 | 12.5 | 12.5 | 12.5 | 5.0 |
| (8) | Styrene | kg | 4.5 | 6.7 | 7.0 | 5.0 | 5.0 | 5.0 | 5.0 | 0.0 | 4.7 |
| | addition rate | kg/h | 25 | 25 | 25 | 25 | 25 | 25 | 25 | 0 | 25 |
| | 1,3-butadiene | kg | 18.0 | 26.7 | 28.0 | 20.0 | 20.0 | 20.0 | 20.0 | 25.0 | 18.7 |
| | addition rate | kg/h | 100 | 100 | 100 | 100 | 100 | 100 | 100 | 100 | 100 |
| (9) | Styrene | kg | 74.0 | 61.4 | 56.6 | 74.0 | 74.0 | 74.0 | 74.0 | 74.0 | 110.0 |
| (11) | Mp × $10^{-4}$ | — | 9.5 | 9.3 | 9.4 | 15.2 | 14.0 | 4.5 | 3.8 | 7.1 | 12.1 |
| | Mw/Mn | — | 1.02 | 1.02 | 1.02 | 1.01 | 1.01 | 1.05 | 1.05 | 1.06 | 1.02 |
| Conjugated diene mass ratio | | % | 27.0 | 40.1 | 42.0 | 30.0 | 30.0 | 30.0 | 30.0 | 37.5 | 28.0 | n-Butyllithium: addition amount of 10 mass % cyclohexane solution
Mp: peak top molecular weight,
Mn: number average molecular weight,
Mw: weight average molecular weight.

TABLE 3

| | | | Polymerization Example No. 30 | Polymerization Example No. 31 |
|---|---|---|---|---|
| (1) | Cyclohexane | kg | 500 | 500 |
| | THF | g | 75 | 75 |
| (2) | n-butyllithium | ml | 1910 | 3460 |
| (3) | Styrene | kg | 75.2 | 74.0 |
| (4) | Styrene | kg | 75.2 | 0.0 |
| (5) | Styrene | kg | 2.0 | 5.0 |
| | addition rate | kg/h | 25 | 25 |
| | 1,3-butadiene | kg | 8.0 | 20.0 |
| | addition rate | kg/h | 100 | 100 |
| (6) | Styrene | kg | 4.8 | 12.5 |
| (7) | Styrene | kg | 2.0 | 5.0 |
| | addition rate | kg/h | 25 | 25 |
| | 1,3-butadiene | kg | 8.0 | 20.0 |
| | addition rate | kg/h | 100 | 100 |
| (8) | Styrene | kg | 4.8 | 12.5 |
| (9) | Styrene | kg | 2.0 | 5.0 |
| | addition rate | kg/h | 25 | 25 |
| | 1,3-butadiene | kg | 8.0 | 20.0 |
| | addition rate | kg/h | 100 | 100 |
| (10) | Styrene | kg | 10.0 | 26.0 |
| (11) | Epoxidized soybean oil | g | 149 | 387 |
| | Cyclohexane | kg | 2.5 | 3.8 |
| (13) | Mp × $10^{-4}$ | — | 11.1 | 7.1 |
| | Mw/Mn | — | 1.53 | 1.46 |
| | Conjugated diene mass ratio | % | 12.0 | 30.0 | n-Butyllithium: addition amount of 10 mass % cyclohexane solution
Mp: peak top molecular weight,
Mn: number average molecular weight,
Mw: weight average molecular weight.

TABLE 4

| | | | Polymerization Example No. 32 | Polymerization Example No. 33 | Polymerization Example No. 34 |
|---|---|---|---|---|---|
| (1) | Cyclohexane | kg | 500 | 500 | 500 |
| | THF | g | 75 | 75 | 75 |
| (2) | n-butyllithium | ml | 1280 | 2180 | 2460 |
| (3) | Styrene | kg | 10.0 | 10.0 | 26.0 |
| (4) | Styrene | kg | 15.6 | 16.0 | 40.0 |
| | addition rate | kg/h | 60 | 25 | 60 |
| | 1,3-butadiene | kg | 24.0 | 64.0 | 60.0 |
| | addition rate | kg/h | 90 | 100 | 90 |
| (5) | Styrene | kg | 75.2 | 110.0 | 74.0 |
| (6) | Styrene | kg | 75.2 | 0.0 | 0.0 |
| (8) | Mp × $10^{-4}$ | — | 18.4 | 11.3 | 9.6 |
| | Mw/Mn | — | 1.02 | 1.01 | 1.04 |
| | Conjugated diene mass ratio | % | 12.0 | 32.0 | 30.0 | n-Butyllithium: addition amount of 10 mass % cyclohexane solution
Mp: peak top molecular weight,
Mn: number average molecular weight,
Mw: weight average molecular weight.

TABLE 5

| | | | Polymerization Example No. 35 | Polymerization Example No. 36 |
|---|---|---|---|---|
| (1) | Cyclohexane | kg | 500 | 500 |
| | THF | g | 75 | 75 |
| (2) | n-butyllithium | ml | 1290 | 2550 |
| (3) | Styrene | kg | 10.0 | 26.0 |
| (4) | 1,3-butadiene | kg | 8.0 | 20.0 |
| | Styrene | kg/h | 5.2 | 13.3 |
| (5) | 1,3-butadiene | kg | 8.0 | 20.0 |
| | Styrene | kg/h | 5.2 | 13.4 |
| (6) | 1,3-butadiene | kg | 8.0 | 20.0 |
| | Styrene | kg/h | 5.2 | 13.3 |
| (7) | Styrene | kg | 75.2 | 74.0 |
| (8) | Styrene | kg | 75.2 | 0.0 |
| (10) | Mp × $10^{-4}$ | — | 18.9 | 9.8 |
| | Mw/Mn | — | 1.04 | 1.03 |
| | Conjugated diene mass ratio | % | 12.0 | 30.0 | n-Butyllithium: addition amount of 10 mass % cyclohexane solution
Mp: peak top molecular weight,
Mn: number average molecular weight,
Mw: weight average molecular weight.

TABLE 6

| | | | Polymerization Example No. 37 | Polymerization Example No. 38 |
|---|---|---|---|---|
| (1) | Cyclohexane | kg | 500 | 500 |
| | THF | g | 75 | 75 |
| (2) | n-butyllithium | ml | 1230 | 2580 |
| (3) | Styrene | kg | 10.0 | 26.0 |
| (4) | Styrene | kg | 3.0 | 7.5 |
| | addition rate | kg/h | 25 | 25 |
| | 1,3-butadiene | kg | 12.0 | 30.0 |
| | addition rate | kg/h | 100 | 100 |
| (5) | Styrene | kg | 9.6 | 25.0 |
| (6) | Styrene | kg | 3.0 | 7.5 |
| | addition rate | kg/h | 25 | 25 |
| | 1,3-butadiene | kg | 12.0 | 30.0 |
| | addition rate | kg/h | 100 | 100 |
| (7) | Styrene | kg | 75.2 | 74.0 |
| (8) | Styrene | kg | 75.2 | 0.0 |
| (10) | Mp × $10^{-4}$ | — | 18.7 | 9.6 |
| | Mw/Mn | — | 1.03 | 1.04 |
| | Conjugated diene mass ratio | % | 12.0 | 30.0 | n-Butyllithium: addition amount of 10 mass % cyclohexane solution
Mp: peak top molecular weight,
Mn: number average molecular weight,
Mw: weight average molecular weight.

TABLE 7

| | | | Polymerization Example No. 39 | Polymerization Example No. 40 |
|---|---|---|---|---|
| (1) | Cyclohexane | kg | 500 | 500 |
| | THF | g | 75 | 75 |
| (2) | n-butyllithium | ml | 1210 | 2600 |
| (3) | Styrene | kg | 10.0 | 26.0 |
| (4) | Styrene | kg | 1.5 | 3.7 |
| | addition rate | kg/h | 25 | 25 |
| | 1,3-butadiene | kg | 6.0 | 15.0 |
| | addition rate | kg/h | 100 | 100 |
| (5) | Styrene | kg | 3.2 | 8.3 |
| (6) | Styrene | kg | 1.5 | 3.8 |
| | addition rate | kg/h | 25 | 25 |
| | 1,3-butadiene | kg | 6.0 | 15.0 |
| | addition rate | kg/h | 100 | 100 |
| (7) | Styrene | kg | 3.2 | 8.4 |
| (8) | Styrene | kg | 1.5 | 3.7 |
| | addition rate | kg/h | 25 | 25 |
| | 1,3-butadiene | kg | 6.0 | 15.0 |
| | addition rate | kg/h | 100 | 100 |
| (9) | Styrene | kg | 3.2 | 8.3 |
| (10) | Styrene | kg | 1.5 | 3.8 |
| | addition rate | kg/h | 25 | 25 |
| | 1,3-butadiene | kg | 6.0 | 15.0 |
| | addition rate | kg/h | 100 | 100 |

TABLE 7-continued

|  |  |  | Polymerization Example No. 39 | Polymerization Example No. 40 |
|---|---|---|---|---|
| (11) | Styrene | kg | 75.2 | 74.0 |
| (12) | Styrene | kg | 75.2 | 0.0 |
| (14) | Mp × 10⁻⁴ | — | 18.5 | 9.5 |
|  | Mw/Mn | — | 1.04 | 1.04 |

TABLE 7-continued

|  |  | Polymerization Example No. 39 | Polymerization Example No. 40 |
|---|---|---|---|
| Conjugated diene mass ratio | % | 12.0 | 30.0 | n-Butyllithium: addition amount of 10 mass % cyclohexane solution
Mp: peak top molecular weight,
Mn: number average molecular weight,
Mw: weight average molecular weight.

TABLE 8

| | Block copolymer resin composition blend ratio | | Conjugated diene mass ratio | Block ratio | Mw/Mn | tanδ peak temperature | tanδ (max + 30° C.)/ tanδ (max) |
|---|---|---|---|---|---|---|---|
| | Block copolymer (a) | Block copolymer (b) | % | % | — | ° C. | — |
| Blend Example 1 | Polymerization Example 1 60.0% | Polymerization Example 13 40.0% | 22 | 96 | 1.30 | −60 | 0.67 |
| Blend Example 2 | Polymerization Example 1 33.3% | Polymerization Example 13 66.7% | 28 | 96 | 1.39 | −59 | 0.73 |
| Blend Example 3 | Polymerization Example 1 15.0% | Polymerization Example 13 85.0% | 32 | 96 | 1.10 | −58 | 0.70 |
| Blend Example 4 | Polymerization Example 1 33.3% | Polymerization Example 15 66.7% | 24 | 90 | 1.30 | −46 | 0.70 |
| Blend Example 5 | Polymerization Example 1 33.3% | Polymerization Example 16 66.7% | 28 | 98 | 1.30 | −70 | 0.91 |
| Blend Example 6 | Polymerization Example 2 33.3% | Polymerization Example 17 66.7% | 24 | 96 | 1.30 | −54 | 0.85 |
| Blend Example 7 | Polymerization Example 3 33.3% | Polymerization Example 18 66.7% | 24 | 96 | 1.29 | −55 | 0.91 |
| Blend Example 8 | Polymerization Example 2 33.3% | Polymerization Example 17 33.3% Polymerization Example 31 33.3% | 24 | 96 | 1.40 | −51 | 0.96 |
| Blend Example 9 | Polymerization Example 30 33.3% | Polymerization Example 19 66.7% | 24 | 96 | 1.39 | −60 | 0.85 |
| Blend Example 10 | Polymerization Example 3 33.3% | Polymerization Example 31 66.7% | 24 | 96 | 1.46 | −46 | 0.95 |
| Blend Example 11 | Polymerization Example 30 33.3% | Polymerization Example 31 66.7% | 24 | 96 | 1.60 | −45 | 0.99 |
| Blend Example 12 | Polymerization Example 5 25.0% | Polymerization Example 21 75.0% | 23 | 96 | 1.20 | −59 | 0.83 |
| Blend Example 13 | Polymerization Example 6 60.0% | Polymerization Example 22 40.0% | 28 | 96 | 1.30 | −58 | 0.74 |
| Blend Example 14 | Polymerization Example 9 33.3% | Polymerization Example 18 66.7% | 24 | 96 | 1.50 | −55 | 0.92 |
| Blend Example 15 | Polymerization Example 10 33.3% | Polymerization Example 18 66.7% | 24 | 96 | 1.20 | −54 | 0.95 |
| Blend Example 16 | Polymerization Example 12 33.3% | Polymerization Example 25 66.7% | 24 | 96 | 1.25 | −54 | 0.89 |
| Blend Example 17 | Polymerization Example 12 33.3% | Polymerization Example 26 66.7% | 24 | 96 | 1.50 | −50 | 0.88 |
| Blend Example 18 | Polymerization Example 1 66.7% | Polymerization Example 13 33.3% | 21 | 96 | 1.30 | −60 | 0.68 |
| Blend Example 19 | Polymerization Example 1 10.0% | Polymerization Example 13 90.0% | 33 | 96 | 1.10 | −58 | 0.70 |
| Blend Example 20 | Polymerization Example 1 33.3% | Polymerization Example 14 66.7% | 22 | 89 | 1.30 | −40 | 0.74 |
| Blend Example 21 | Polymerization Example 1 33.3% | Polymerization Example 28 66.7% | 30 | 99 | 1.30 | −74 | 0.90 |
| Blend Example 22 | | Polymerization Example 29 100% | 28 | 96 | 1.02 | −63 | 0.61 |
| Blend Example 23 | | Polymerization Example 33 100% | 32 | 96 | 1.01 | −65 | 0.22 |
| Blend Example 24 | Polymerization Example 30 33.3% | Polymerization Example 17 66.7% | 24 | 96 | 1.70 | −51 | 0.94 |
| Blend Example 25 | Polymerization Example 32 33.3% | Polymerization Example 34 66.7% | 24 | 85 | 1.30 | −37 | 0.40 |
| Blend Example 26 | Polymerization Example 32 33.3% | Polymerization Example 18 33.3% Polymerization Example 34 33.3% | 24 | 90 | 1.30 | −42 | 0.53 |
| Blend | Polymerization Example 4 | Polymerization Example 20 | 22 | 96 | 1.20 | −60 | 0.75 |

TABLE 8-continued

| | Block copolymer resin composition blend ratio | | Conjugated diene mass ratio % | Block ratio % | Mw/Mn | tanδ peak temperature ° C. | tanδ (max + 30° C.)/ tanδ (max) |
|---|---|---|---|---|---|---|---|
| | Block copolymer (a) | Block copolymer (b) | | | | | |
| Example 27 Blend | 25.0% Polymerization Example 7 | 75.0% Polymerization Example 23 | 32 | 96 | 1.30 | −58 | 0.72 |
| Example 28 Blend | 60.0% Polymerization Example 6 | 40.0% Polymerization Example 22 | | | | | |
| Example 29 Blend | 65.0% Polymerization Example 6 | 35.0% Polymerization Example 22 | 27 | 96 | 1.30 | −59 | 0.77 |
| Example 30 Blend | 33.3% Polymerization Example 8 | 66.7% Polymerization Example 18 | 33 | 96 | 1.30 | −58 | 0.75 |
| Example 31 Blend | 33.3% Polymerization Example 11 | 66.7% Polymerization Example 18 | 24 | 96 | 1.50 | −61 | 0.86 |
| Example 32 Blend | 33.3% Polymerization Example 12 | 66.7% Polymerization Example 24 | 24 | 96 | 1.10 | −55 | 0.86 |
| Example 33 Blend | 33.3% Polymerization Example 12 | 66.7% Polymerization Example 27 | 24 | 96 | 1.25 | −57 | 0.89 |
| Example 34 Blend | 33.3% Polymerization Example 35 | 66.7% Polymerization Example 36 | 24 | 96 | 1.60 | −53 | 0.88 |
| Example 35 Blend | 33.3% Polymerization Example 37 | 66.7% Polymerization Example 38 | 24 | 89 | 1.30 | −52 | 0.48 |
| Example 36 Blend | 33.3% Polymerization Example 39 | 66.7% Polymerization Example 40 | 24 | 96 | 1.29 | −55 | 0.92 |
| Example 37 | 33.3% | 66.7% | 24 | 96 | 1.29 | −57 | 0.88 |

TABLE 9

| | Sheet blending | | | Sheet impact kJ/m | DuPont impact strength J | Folding strength times | Elastic modulus in tension MPa | Transparency % |
|---|---|---|---|---|---|---|---|---|
| | Block copolymer resin composition | | GPPS | | | | | |
| Ex. 1 | Polymerization Example 1 | 40% | 60% | 2.7 | 0.12 | 110 | 1800 | 3.3 |
| Ex. 2 | Polymerization Example 2 | 40% | 60% | >5.0 | 0.29 | 130 | 1650 | 4.2 |
| Ex. 3 | Polymerization Example 3 | 40% | 60% | >5.0 | 0.32 | 1000 | 1300 | 6.0 |
| Ex. 4 | Polymerization Example 4 | 40% | 60% | 2.7 | 0.12 | 120 | 1700 | 2.8 |
| Ex. 5 | Polymerization Example 5 | 40% | 60% | >5.0 | 0.30 | 200 | 1400 | 4.5 |
| Ex. 6 | Polymerization Example 6 | 40% | 60% | 2.7 | 0.18 | 120 | 1350 | 5.5 |
| Ex. 7 | Polymerization Example 7 | 40% | 60% | 2.9 | 0.22 | 210 | 1750 | 2.9 |
| Ex. 8 | Polymerization Example 8 | 40% | 60% | 2.7 | 0.16 | 290 | 1650 | 5.3 |
| Ex. 9 | Polymerization Example 9 | 40% | 60% | 2.7 | 0.14 | 160 | 1800 | 3.5 |
| Ex. 10 | Polymerization Example 10 | 40% | 60% | 2.8 | 0.17 | 280 | 1750 | 5.0 |
| Ex. 11 | Polymerization Example 11 | 40% | 60% | 2.7 | 0.12 | 200 | 1650 | 6.0 |
| Ex. 12 | Polymerization Example 12 | 40% | 60% | 2.7 | 0.12 | 110 | 1800 | 2.1 |
| Ex. 13 | Polymerization Example 13 | 40% | 60% | 2.7 | 0.12 | 330 | 1350 | 5.9 |
| Ex. 14 | Polymerization Example 14 | 40% | 60% | 2.7 | 0.14 | 190 | 1750 | 3.2 |
| Ex. 15 | Polymerization Example 15 | 40% | 60% | 3.0 | 0.24 | 260 | 1700 | 3.6 |
| Ex. 16 | Polymerization Example 16 | 40% | 60% | 2.7 | 0.12 | 150 | 1800 | 3.0 |
| Ex. 17 | Polymerization Example 17 | 40% | 60% | 3.0 | 0.14 | 200 | 1350 | 6.0 |
| Ex. 18 | Polymerization Example 7 | 80% | 20% | >5.0 | 0.85 | >5000 | 1300 | 2.5 |
| Ex. 19 | Polymerization Example 7 | 60% | 40% | 3.3 | 0.58 | 1250 | 1500 | 3.4 |
| Ex. 20 | Polymerization Example 7 | 20% | 80% | 2.7 | 0.12 | 110 | 1900 | 2.3 |
| Ex. 21 | Polymerization Example 27 | 40% | 60% | 2.6 | 0.10 | 100 | 1900 | 1.8 |
| Ex. 22 | Polymerization Example 28 | 40% | 60% | 2.8 | 0.20 | 710 | 1150 | 6.0 |
| Ex. 23 | Polymerization Example 29 | 40% | 60% | 2.6 | 0.10 | 260 | 1350 | 5.7 |
| Ex. 24 | Polymerization Example 31 | 40% | 60% | 2.9 | 0.12 | 200 | 1650 | 7.0 |
| Ex. 25 | Polymerization Example 32 | 40% | 60% | 2.6 | 0.10 | 100 | 1500 | 5.0 |
| Ex. 26 | Polymerization Example 33 | 40% | 60% | 2.7 | 0.10 | 150 | 1800 | 2.7 |
| Ex. 27 | Polymerization Example 34 | 40% | 60% | 2.9 | 0.15 | 200 | 1300 | 7.0 |
| Ex. 28 | Polymerization Example 36 | 40% | 60% | 2.7 | 0.13 | 170 | 1750 | 2.9 |
| Ex. 29 | Polymerization Example 37 | 40% | 60% | 2.8 | 0.16 | 180 | 1750 | 3.1 |

TABLE 10

| | Sheet blending | | | Sheet impact kJ/m | DuPont impact strength J | Folding strength times | Elastic modulus in tension MPa | Transparency % |
|---|---|---|---|---|---|---|---|---|
| | Block copolymer resin composition | | GPPS | | | | | |
| Comp. Ex. 1 | Polymerization Example 18 | 40% | 60% | 2.4 | 0.07 | 80 | 1950 | 3.0 |

TABLE 10-continued

| | Sheet blending | | | Sheet impact kJ/m | DuPont impact strength J | Folding strength times | Elastic modulus in tension MPa | Transparency % |
|---|---|---|---|---|---|---|---|---|
| | Block copolymer resin composition | | GPPS | | | | | |
| Comp. Ex. 2 | Polymerization Example 19 | 40% | 60% | >5.0 | 0.24 | 1100 | 1100 | 15.0 |
| Comp. Ex. 3 | Polymerization Example 20 | 40% | 60% | 2.5 | 0.07 | 80 | 1800 | 2.5 |
| Comp. Ex. 4 | Polymerization Example 21 | 40% | 60% | >5.0 | 0.29 | 250 | 1100 | 8.0 |
| Comp. Ex. 5 | Polymerization Example 22 | 40% | 60% | 2.7 | 0.07 | 70 | 1900 | 2.9 |
| Comp. Ex. 6 | Polymerization Example 24 | 40% | 60% | 2.5 | 0.12 | 170 | 1750 | 8.0 |
| Comp. Ex. 7 | Polymerization Example 25 | 40% | 60% | 2.5 | 0.05 | 15 | 1850 | 3.6 |
| Comp. Ex. 8 | Polymerization Example 26 | 40% | 60% | 2.4 | 0.07 | 90 | 1850 | 3.9 |
| Comp. Ex. 9 | Polymerization Example 30 | 40% | 60% | 3.2 | 0.15 | 490 | 1000 | 9.3 |
| Comp. Ex. 10 | Polymerization Example 35 | 40% | 60% | 2.3 | 0.07 | 170 | 1800 | 2.7 |

TABLE 11

| | Sheet blending | | | Sheet impact kJ/m | DuPont impact strength J | Folding strength times | Elastic modulus in tension MPa | Transparency % |
|---|---|---|---|---|---|---|---|---|
| | Block copolymer resin composition | | GPPS | | | | | |
| Ref Ex. 1 | Polymerization Example 23 | 40% | 60% | 3.1 | 0.06 | 30 | 1600 | 4.1 |

INDUSTRIAL APPLICABILITY

The resin composition of the present invention, and a composition having the resin composition blended with a thermoplastic resin, are useful as a material for a sheet or a film, and can be widely used as a food packaging container and in addition, daily goods packaging, a laminate sheet/film, etc., by making use of excellent impact resistance, transparency and mechanical properties.

The entire disclosure of Japanese Patent Application No. 2014-118120 filed on Jun. 6, 2014 including specification, claims and summary is incorporated herein by reference in its entirety.

The invention claimed is:

1. A resin composition comprising a block copolymer of a vinyl aromatic hydrocarbon and a conjugated diene, which satisfies (A) to (D):
   (A) a content of the conjugated diene is from 22 to 32% by mass,
   (B) a block ratio of the vinyl aromatic hydrocarbon is from 90 to 98%,
   (C) Mw/Mn, wherein Mw is a weight average molecular weight and Mn is a number average molecular weight, is from 1.1 to 1.6 as obtained by gel permeation chromatography (GPC) by a differential refractive index method,
   (D) a loss tangent, tan δ, obtained by dynamic viscoelasticity measurement has one local maximum value, tan δ (max), within a temperature range of from −90 to −30° C., and tan δ (max+30° C.), which is tan δ at a temperature higher by 30° C. than the temperature at the local maximum value, tan δ peak temperature, is at least 0.6 relative to tan δ (max) at the temperature at the local maximum value.

2. The resin composition according to claim 1, wherein the block copolymer is a block copolymer of a vinyl aromatic hydrocarbon and a conjugated diene represented by a formula (I) and/or (II):

$$S-(R-S)n-R-S \qquad (I)$$

$$(S-(R-S)n-R-S)m-X \qquad (II)$$

wherein S is a polymer block in which a monomer unit consists of the vinyl aromatic hydrocarbon, R is a random copolymer block in which a monomer unit consists of the vinyl aromatic hydrocarbon and the conjugated diene, m is an integer of at least 1, representing a number of a polymer chain bonded to a coupling agent residue, n is an integer of at least 1, representing a number of repeating units, and X represents a residue of a coupling agent.

3. The resin composition according to claim 1, comprising a block copolymer (a) of a vinyl aromatic hydrocarbon and a conjugated diene which satisfies (i) and (ii), and a block copolymer (b) of a vinyl aromatic hydrocarbon and a conjugated diene which satisfies (iii) and (iv) in a mass ratio of (a)/(b) of 15 to 60 parts by mass of (a) to 40 to 85 parts by mass of (b):
   (i) in gel permeation chromatogram, there is at least one peak with a peak top molecular weight of from 105,000 to 250,000,
   (ii) a content of the conjugated diene is from 10 to 20% by mass, (iii) in a gel permeation chromatogram, there is at least one peak with a peak top molecular weight of from 45,000 to 140,000, and (iv) a content of the conjugated diene is from 27 to 40% by mass.

4. The resin composition according to claim 1, wherein the vinyl aromatic hydrocarbon is styrene, and the conjugated diene is 1,3-butadiene.

5. A resin composition, comprising:
(i) the resin composition of claim 1, and
(ii) a thermoplastic resin.

6. The resin composition according to claim 5, wherein a content of the resin composition (i) to the thermoplastic resin (ii) is in a range from 20/80 to 80/20.

7. The resin composition according to claim 5, wherein the thermoplastic resin is a polystyrene polymer.

8. A formed product obtained by forming the resin composition of claim 1.

9. The formed product according to claim 8, which is a sheet, a film or an injection-formed product.

10. A formed product obtained by secondary processing of the formed product of claim 8.

11. The formed product according to claim 10, which is a container, an oriented sheet or an oriented film.

12. A formed product obtained by tertiary processing of the oriented sheet or the oriented film of claim 11.

13. The formed product according to claim 12, which is a container.

* * * * *